US012409086B2

(12) United States Patent
Ponsi et al.

(10) Patent No.: US 12,409,086 B2
(45) Date of Patent: Sep. 9, 2025

(54) METHOD AND DEVICE FOR TURNING AND POSITIONING A PATIENT USING FILLABLE CHAMBERS

(71) Applicant: Sage Products, LLC, Cary, IL (US)

(72) Inventors: Lawrence G. Ponsi, Wheeling, IL (US); Abhishek R. Patel, North Barrington, IL (US); Brett C. Blabas, Naperville, IL (US); Jay R. Roberts, Cary, IL (US)

(73) Assignee: Sage Products, LLC, Cary, IL (US)

( * ) Notice: Subject to any disclaimer, the term of this patent is extended or adjusted under 35 U.S.C. 154(b) by 0 days.

(21) Appl. No.: 18/397,666

(22) Filed: Dec. 27, 2023

(65) Prior Publication Data

US 2024/0164962 A1 May 23, 2024

Related U.S. Application Data

(62) Division of application No. 17/733,422, filed on Apr. 29, 2022, now Pat. No. 11,890,240.

(60) Provisional application No. 63/217,631, filed on Jul. 1, 2021, provisional application No. 63/182,504, filed on Apr. 30, 2021.

(51) Int. Cl.
*A61G 7/00* (2006.01)

(52) U.S. Cl.
CPC .................................... *A61G 7/001* (2013.01)

(58) Field of Classification Search
None
See application file for complete search history.

(56) References Cited

U.S. PATENT DOCUMENTS

| | | | |
|---|---|---|---|
| 542,720 | A | 7/1895 | Weiss |
| 674,451 | A | 5/1901 | Bunker |
| 1,334,901 | A | 3/1920 | Higdon |
| 1,726,939 | A | 9/1929 | Anderson |
| 2,068,134 | A | 1/1937 | Houghton |
| 2,573,375 | A | 10/1951 | Winstead |
| 2,582,439 | A | 1/1952 | Kavanagh |
| 2,750,606 | A | 6/1956 | Freedlander et al. |

(Continued)

FOREIGN PATENT DOCUMENTS

| | | | |
|---|---|---|---|
| AU | 2008256995 | A1 | 12/2008 |
| CN | 208259823 | U | 12/2018 |

(Continued)

OTHER PUBLICATIONS

Dec. 4, 2012—(WO) International Search Report and Written Opinion—App PCT/US2012/041729, 15 pages.
Dec. 10, 2013—International Preliminary Report on Patentability—App PCT/US2012/041729, 8 pages.
Jul. 12, 2013—(WO) International Search Report and Written Opinion—App PCT/US2013/036448, 9 pages.

(Continued)

*Primary Examiner* — Adam C Ortiz
(74) *Attorney, Agent, or Firm* — FOLEY & LARDNER LLP

(57) ABSTRACT

A system for repositioning or supporting a patient includes a first sheet, the first sheet configured to receive a patient on a top side, and a second sheet coupled to the first sheet, wherein the second sheet comprises at least one tubular pocket therein, and wherein the second sheet is configured to contact a support surface. The system further includes at least one support device configured to be inserted within the at least one tubular pocket, such that when the at least one support device is inserted within the at least one tubular pocket, at least a portion of the patient is elevated relative to the support surface.

20 Claims, 13 Drawing Sheets

(56) References Cited

U.S. PATENT DOCUMENTS

| | | | |
|---|---|---|---|
| 2,804,911 A | 9/1957 | Howarth | |
| D195,020 S | 4/1963 | Emery | |
| 3,112,956 A | 12/1963 | Shick et al. | |
| 3,155,991 A | 11/1964 | Dunham | |
| 3,166,799 A | 1/1965 | Milton | |
| 3,178,732 A | 4/1965 | Stibitz | |
| 3,205,010 A | 9/1965 | Schick | |
| 3,325,832 A | 6/1967 | Malicki | |
| 3,333,286 A | 8/1967 | Biolik | |
| 3,452,372 A | 7/1969 | Emery | |
| 3,474,781 A | 10/1969 | Gaylord, Jr. | |
| 3,477,071 A | 11/1969 | Emerson | |
| 3,503,649 A | 3/1970 | Johnson | |
| 3,523,563 A | 8/1970 | Louis | |
| 3,536,117 A | 10/1970 | Comp | |
| 3,653,083 A | 4/1972 | Lapidus | |
| 3,778,851 A | 12/1973 | Howorth | |
| 3,785,395 A | 1/1974 | Andreasson | |
| 3,829,914 A | 8/1974 | Treat | |
| 3,933,154 A | 1/1976 | Cabansag | |
| 3,965,503 A | 6/1976 | Gridel | |
| 4,030,719 A | 6/1977 | Gabriele et al. | |
| 4,048,681 A | 9/1977 | Baulch et al. | |
| 4,066,072 A | 1/1978 | Cummins | |
| 4,073,021 A | 2/1978 | Carlisle | |
| 4,108,170 A | 8/1978 | Spann | |
| 4,132,228 A | 1/1979 | Green | |
| 4,214,326 A | 7/1980 | Spann | |
| 4,233,700 A | 11/1980 | Spann | |
| 4,247,963 A | 2/1981 | Reddi | |
| 4,272,856 A | 6/1981 | Wegener et al. | |
| 4,370,769 A | 2/1983 | Herzig et al. | |
| 4,389,742 A | 6/1983 | Dewitt | |
| 4,391,010 A | 7/1983 | Kronman | |
| 4,417,710 A | 11/1983 | Adair | |
| 4,425,676 A | 1/1984 | Crane | |
| 4,509,214 A | 4/1985 | Shea | |
| 4,517,690 A | 5/1985 | Wegener | |
| 4,528,704 A | 7/1985 | Wegener et al. | |
| 4,554,693 A | 11/1985 | Calloway | |
| 4,627,426 A | 12/1986 | Wegener et al. | |
| 4,627,796 A | 12/1986 | Moore | |
| 4,662,016 A | 5/1987 | Seeman | |
| 4,662,366 A | 5/1987 | Tari | |
| 4,675,925 A | 6/1987 | Littleton | |
| 4,686,719 A | 8/1987 | Johnson et al. | |
| 4,694,515 A | 9/1987 | Rogers, Jr. | |
| 4,802,249 A | 2/1989 | Bills | |
| 4,809,484 A | 3/1989 | Lovik | |
| 4,823,417 A | 4/1989 | Fukuichi | |
| 4,858,625 A | 8/1989 | Cramer | |
| 4,867,230 A | 9/1989 | Voss | |
| 4,905,712 A | 3/1990 | Bowlin et al. | |
| 4,908,895 A | 3/1990 | Walker | |
| 4,912,861 A | 4/1990 | Huang | |
| 4,944,053 A | 7/1990 | Smith | |
| 4,977,629 A | 12/1990 | Jones | |
| 5,012,821 A | 5/1991 | Tarver | |
| 5,016,650 A | 5/1991 | Marlar | |
| 5,022,110 A | 6/1991 | Stroh | |
| 5,056,533 A | 10/1991 | Solano | |
| 5,060,324 A | 10/1991 | Marinberg et al. | |
| 5,067,189 A | 11/1991 | Weedling et al. | |
| 5,070,559 A | 12/1991 | Pettifer | |
| 5,086,543 A | 2/1992 | Mitchell | |
| 5,088,747 A | 2/1992 | Morrison et al. | |
| 5,111,838 A | 5/1992 | Langston | |
| 5,123,699 A | 6/1992 | Warburton | |
| 5,138,731 A | 8/1992 | Harcrow, Jr. | |
| 5,142,720 A | 9/1992 | Kelso et al. | |
| 5,144,708 A | 9/1992 | Pekar | |
| 5,148,563 A | 9/1992 | Klearman et al. | |
| D331,270 S | 11/1992 | Johnson et al. | |
| 5,168,589 A | 12/1992 | Stroh et al. | |
| 5,182,828 A | 2/1993 | Alivizatos | |
| 5,193,238 A | 3/1993 | Clute | |
| 5,199,121 A | 4/1993 | Payne | |
| 5,226,186 A | 7/1993 | Boyd | |
| 5,280,657 A | 1/1994 | Stagg | |
| 5,329,655 A | 7/1994 | Garner | |
| 5,331,698 A | 7/1994 | Newkirk et al. | |
| 5,362,302 A | 11/1994 | Jensen et al. | |
| 5,369,829 A | 12/1994 | Jay | |
| 5,373,595 A | 12/1994 | Johnson et al. | |
| 5,390,384 A | 2/1995 | Dinsmoor et al. | |
| 5,395,162 A | 3/1995 | Jay et al. | |
| 5,398,678 A | 3/1995 | Gamow | |
| 5,426,801 A | 6/1995 | Klearman et al. | |
| 5,438,721 A | 8/1995 | Pahno et al. | |
| 5,447,235 A | 9/1995 | Pharo | |
| 5,448,790 A | 9/1995 | Saro et al. | |
| 5,451,179 A | 9/1995 | Laroi, Jr. et al. | |
| 5,452,487 A | 9/1995 | Leggett | |
| 5,524,307 A | 6/1996 | Griffin | |
| RE35,299 E | 7/1996 | Weedling et al. | |
| 5,549,121 A | 8/1996 | Vinci | |
| 5,561,873 A | 10/1996 | Weedling | |
| 5,603,591 A | 2/1997 | McLellan | |
| RE35,468 E | 3/1997 | Newman | |
| 5,632,769 A | 5/1997 | Kappel et al. | |
| 5,634,224 A | 6/1997 | Stephen | |
| 5,671,977 A | 9/1997 | Jay et al. | |
| 5,702,153 A | 12/1997 | Pliska | |
| 5,742,958 A | 4/1998 | Solazzo | |
| 5,797,155 A | 8/1998 | Maier et al. | |
| 5,806,928 A | 9/1998 | Gattuso et al. | |
| 5,830,780 A | 11/1998 | Dennison et al. | |
| 5,836,027 A | 11/1998 | Leventhal et al. | |
| 5,836,654 A | 11/1998 | Debellis et al. | |
| 5,957,491 A | 9/1999 | Cech et al. | |
| 6,012,183 A | 1/2000 | Brooke et al. | |
| 6,073,291 A | 6/2000 | Davis | |
| 6,082,824 A | 7/2000 | Chow | |
| 6,102,936 A | 8/2000 | Augustine et al. | |
| 6,108,861 A | 8/2000 | Vystrcil et al. | |
| 6,115,861 A | 9/2000 | Reeder et al. | |
| 6,145,143 A | 11/2000 | Hicks et al. | |
| 6,154,900 A | 12/2000 | Shaw | |
| 6,159,172 A | 12/2000 | Gray et al. | |
| 6,223,368 B1 | 5/2001 | Anslin | |
| 6,223,369 B1 | 5/2001 | Maier et al. | |
| 6,240,584 B1 | 6/2001 | Perez et al. | |
| 6,241,320 B1 | 6/2001 | Chew et al. | |
| 6,241,755 B1 | 6/2001 | Arnold et al. | |
| 6,273,810 B1 | 8/2001 | Rhodes et al. | |
| 6,317,909 B1 | 11/2001 | Blum | |
| 6,327,724 B1 | 12/2001 | Sharrock et al. | |
| 6,347,642 B1 | 2/2002 | Schulte | |
| 6,357,084 B1 | 3/2002 | Haidon | |
| 6,367,106 B1 | 4/2002 | Gronsman | |
| 6,374,435 B1 | 4/2002 | Leininger et al. | |
| 6,413,194 B1 | 7/2002 | Gant | |
| 6,427,268 B1 * | 8/2002 | Davis | A47G 9/0253 5/490 |
| 6,467,106 B1 | 10/2002 | Heimbrock | |
| 6,484,334 B1 | 11/2002 | Borders et al. | |
| 6,510,574 B2 | 1/2003 | Sharrock et al. | |
| 6,541,094 B1 | 4/2003 | Landvik et al. | |
| 6,543,068 B1 | 4/2003 | Penninger | |
| 6,560,793 B2 | 5/2003 | Walker | |
| 6,653,363 B1 | 11/2003 | Tursi et al. | |
| 6,658,676 B1 | 12/2003 | Persson et al. | |
| 6,666,426 B1 | 12/2003 | Taylor | |
| 6,698,041 B2 | 3/2004 | Vansteenburg et al. | |
| 6,701,544 B2 | 3/2004 | Heimbrock | |
| 6,701,558 B2 | 3/2004 | Vansteenburg | |
| 6,701,559 B2 | 3/2004 | Boso et al. | |
| 6,804,845 B2 | 10/2004 | Stewart et al. | |
| 6,820,292 B2 | 11/2004 | Heimbrock | |
| 6,874,176 B2 | 4/2005 | Berge | |
| 6,898,809 B2 | 5/2005 | Davis | |
| D508,182 S | 8/2005 | Colonello | |
| 6,964,073 B1 | 11/2005 | Curry | |
| 6,966,275 B2 | 11/2005 | Whitehill | |

(56) References Cited

U.S. PATENT DOCUMENTS

| | | | | |
|---|---|---|---|---|
| 7,028,350 | B1 | 4/2006 | Davis | |
| 7,032,261 | B2 | 4/2006 | Heimbrock | |
| 7,040,706 | B2 | 5/2006 | Koffler | |
| 7,074,166 | B2 | 7/2006 | Weitzman | |
| 7,107,641 | B2 | 9/2006 | Davis | |
| 7,114,204 | B2 | 10/2006 | Patrick | |
| 7,131,154 | B2 | 11/2006 | Davis et al. | |
| 7,168,115 | B2 | 1/2007 | Davis | |
| 7,210,176 | B2 | 5/2007 | Weedling et al. | |
| 7,225,486 | B2 | 6/2007 | Jackson | |
| 7,240,384 | B2 | 7/2007 | Dudonis | |
| 7,243,382 | B2 | 7/2007 | Weedling et al. | |
| 7,266,852 | B2 | 9/2007 | Davis | |
| 7,337,485 | B2 | 3/2008 | Metzger | |
| 7,340,785 | B2 | 3/2008 | Weedling et al. | |
| 7,373,680 | B2 | 5/2008 | Davis | |
| 7,376,995 | B2 | 5/2008 | Davis | |
| 7,406,723 | B2 | 8/2008 | Davis | |
| 7,415,738 | B2 | 8/2008 | Weedling et al. | |
| 7,467,431 | B2 | 12/2008 | Weedling et al. | |
| 7,506,387 | B1 | 3/2009 | Scordato et al. | |
| 7,565,709 | B2 | 7/2009 | Davis | |
| 7,571,498 | B2 | 8/2009 | Jewell et al. | |
| 7,574,761 | B2 | 8/2009 | Davis | |
| 7,591,029 | B2 | 9/2009 | Weedling et al. | |
| 7,627,910 | B2 | 12/2009 | Davis | |
| 7,650,654 | B2 | 1/2010 | Lambarth et al. | |
| 7,676,862 | B2 | 3/2010 | Poulos et al. | |
| 7,681,262 | B2 | 3/2010 | Weedling et al. | |
| 7,712,170 | B2 | 5/2010 | Davis | |
| 7,731,282 | B2 | 6/2010 | Leeds | |
| 7,731,283 | B2 | 6/2010 | Leeds | |
| 7,735,164 | B1 | 6/2010 | Patrick | |
| 7,739,758 | B2 | 6/2010 | Weedling et al. | |
| 7,757,318 | B2 | 7/2010 | Poulos et al. | |
| 7,784,132 | B2 | 8/2010 | Gonzalez et al. | |
| 7,810,193 | B1 | 10/2010 | Ennis et al. | |
| 7,900,299 | B2 | 3/2011 | Weedling et al. | |
| 7,914,081 | B1 | 3/2011 | Smith | |
| 7,914,611 | B2 | 3/2011 | Vrzalik et al. | |
| 7,954,187 | B1 | 6/2011 | Earnest | |
| 8,001,635 | B2 | 8/2011 | Humbles | |
| 8,118,920 | B2 | 2/2012 | Vrzalik | |
| 8,127,382 | B1 * | 3/2012 | Plascencia | A47G 9/1045<br>5/639 |
| 8,128,065 | B2 | 3/2012 | King et al. | |
| 8,161,583 | B1 | 4/2012 | Palen | |
| 8,214,951 | B1 | 7/2012 | Batta | |
| 8,234,727 | B2 | 8/2012 | Schreiber et al. | |
| 8,276,222 | B1 | 10/2012 | Patrick | |
| 8,302,222 | B2 | 11/2012 | Jasani | |
| 8,353,069 | B1 | 1/2013 | Miller | |
| 8,372,182 | B2 | 2/2013 | Vrzalik et al. | |
| 8,387,177 | B2 | 3/2013 | Davis | |
| 8,413,277 | B2 | 4/2013 | Davis et al. | |
| 8,464,376 | B1 * | 6/2013 | Waite | A47G 9/0253<br>5/636 |
| 8,464,720 | B1 | 6/2013 | Pigazzi et al. | |
| 8,511,314 | B2 | 8/2013 | Pigazzi et al. | |
| 8,539,621 | B2 | 9/2013 | West | |
| 8,539,622 | B2 | 9/2013 | West | |
| 8,539,623 | B2 | 9/2013 | West | |
| 8,566,977 | B2 | 10/2013 | Davis | |
| 8,590,574 | B2 | 11/2013 | Jian et al. | |
| 8,601,623 | B1 | 12/2013 | West | |
| 8,602,032 | B2 | 12/2013 | Goldsmith | |
| 8,661,580 | B2 | 3/2014 | Giap | |
| 8,678,418 | B1 | 3/2014 | Quarles | |
| 8,782,830 | B2 | 7/2014 | Brykalski et al. | |
| 8,789,533 | B2 | 7/2014 | Steffens et al. | |
| D712,555 | S | 9/2014 | Berg | |
| 8,850,634 | B2 | 10/2014 | Ponsi et al. | |
| 8,918,930 | B2 | 12/2014 | Stroh et al. | |
| 8,978,184 | B1 | 3/2015 | Garrett | |
| 9,132,052 | B2 | 9/2015 | Fowler et al. | |
| 9,161,876 | B2 | 10/2015 | Pigazzi et al. | |
| 9,254,231 | B2 | 2/2016 | Vrzalik et al. | |
| 9,271,588 | B1 * | 3/2016 | Phillips | A47G 9/04 |
| 9,308,122 | B2 | 4/2016 | Dunlop | |
| 9,321,392 | B1 | 4/2016 | Lebrun | |
| 9,326,903 | B2 | 5/2016 | Locke | |
| 9,332,850 | B2 | 5/2016 | Krishtul | |
| 9,375,343 | B2 | 6/2016 | Marshall et al. | |
| 9,522,078 | B2 | 12/2016 | Pizzini | |
| 9,538,853 | B2 | 1/2017 | Vrzalik et al. | |
| 9,554,956 | B2 | 1/2017 | Reiners et al. | |
| D781,615 | S | 3/2017 | Parman | |
| 9,675,509 | B2 | 6/2017 | Tilk et al. | |
| 9,693,919 | B2 | 7/2017 | Berman | |
| 9,693,920 | B2 | 7/2017 | Fowler et al. | |
| 9,750,656 | B1 | 9/2017 | Pigazzi et al. | |
| 9,782,287 | B2 | 10/2017 | Pigazzi et al. | |
| 9,782,312 | B2 | 10/2017 | Brubaker et al. | |
| 9,782,313 | B2 | 10/2017 | Hindson | |
| 9,795,529 | B2 | 10/2017 | Lehtio | |
| 9,835,344 | B2 | 12/2017 | Vrzalik et al. | |
| 9,849,053 | B2 | 12/2017 | Rigoni et al. | |
| 9,907,408 | B2 | 3/2018 | Vrzalik et al. | |
| 9,931,262 | B2 | 4/2018 | Pigazzi et al. | |
| 9,949,883 | B1 | 4/2018 | Pigazzi et al. | |
| 9,962,122 | B2 | 5/2018 | Augustine et al. | |
| 9,968,500 | B1 | 5/2018 | Amini et al. | |
| 10,016,066 | B2 | 7/2018 | Howard | |
| 10,034,808 | B2 | 7/2018 | Vrzalik et al. | |
| 10,039,680 | B2 | 8/2018 | Galbraith | |
| 10,045,902 | B1 | 8/2018 | Pigazzi et al. | |
| 10,064,770 | B2 | 9/2018 | Reiners et al. | |
| 10,092,470 | B2 | 10/2018 | Lewis | |
| 10,098,800 | B2 | 10/2018 | Pigazzi et al. | |
| 10,112,513 | B2 | 10/2018 | Patrick et al. | |
| 10,159,533 | B2 | 12/2018 | Moll et al. | |
| 10,172,470 | B1 | 1/2019 | Vrzalik et al. | |
| 10,206,830 | B2 | 2/2019 | Fowler et al. | |
| 10,285,888 | B2 | 5/2019 | Liu | |
| 10,285,890 | B1 | 5/2019 | Pigazzi et al. | |
| 10,314,417 | B2 | 6/2019 | Duck | |
| 10,322,050 | B1 | 6/2019 | Pigazzi et al. | |
| 10,363,185 | B2 | 7/2019 | Purdy et al. | |
| 10,363,188 | B2 | 7/2019 | Young | |
| 10,376,430 | B2 | 8/2019 | Liu | |
| 10,398,614 | B2 | 9/2019 | Rigoni et al. | |
| 10,500,115 | B2 | 12/2019 | Weedling | |
| 10,512,578 | B2 | 12/2019 | Visco | |
| 10,561,522 | B2 | 2/2020 | Giap | |
| 10,568,435 | B2 | 2/2020 | Luckemeyer et al. | |
| 10,576,004 | B1 | 3/2020 | Frances | |
| 10,588,800 | B2 | 3/2020 | Fletcher et al. | |
| 10,709,626 | B1 | 7/2020 | Gomez | |
| 10,716,724 | B2 | 7/2020 | Vrzalik et al. | |
| 10,765,576 | B2 | 9/2020 | Rigoni et al. | |
| 10,765,580 | B1 | 9/2020 | Augustine | |
| 10,772,778 | B2 | 9/2020 | Hahn et al. | |
| 10,828,216 | B2 | 11/2020 | Phalen et al. | |
| 10,912,699 | B2 | 2/2021 | Pigazzi et al. | |
| 10,993,866 | B2 | 5/2021 | Augustine | |
| 11,020,301 | B2 | 6/2021 | Messerschmidt | |
| 11,224,548 | B2 | 1/2022 | Depauw | |
| 11,224,550 | B1 | 1/2022 | Gomez | |
| 11,266,525 | B2 | 3/2022 | Kaforey et al. | |
| 11,298,282 | B2 | 4/2022 | Davis et al. | |
| 11,324,650 | B2 | 5/2022 | Zhou et al. | |
| 11,364,166 | B2 | 6/2022 | Grindstaff et al. | |
| 11,439,551 | B2 | 9/2022 | Davis et al. | |
| 11,471,317 | B1 | 10/2022 | Spears | |
| 11,484,431 | B2 | 11/2022 | Allen | |
| 11,484,456 | B2 | 11/2022 | Pigazzi et al. | |
| 11,510,836 | B2 | 11/2022 | Cole et al. | |
| 11,607,358 | B2 | 3/2023 | Spahn et al. | |
| 11,638,670 | B1 | 5/2023 | Volz et al. | |
| 11,642,267 | B2 | 5/2023 | Kea et al. | |
| 11,654,068 | B2 | 5/2023 | Giap | |
| 11,661,129 | B2 | 5/2023 | Chambers et al. | |
| 11,701,281 | B2 | 7/2023 | Meah | |
| 11,737,939 | B2 | 8/2023 | Davis et al. | |

(56) References Cited

U.S. PATENT DOCUMENTS 11,833,091 B2 12/2023 Vrzalik et al.
11,890,240 B2 2/2024 Ponsi et al.
2001/0013146 A1 8/2001 Wempe
2001/0040402 A1 11/2001 Odderson
2002/0029417 A1 3/2002 Walker
2002/0108179 A1 8/2002 Kiser
2002/0109381 A1 8/2002 Duncan
2002/0112286 A1 8/2002 Upton et al.
2002/0133877 A1 9/2002 Kuiper et al.
2002/0148045 A1 10/2002 Giori et al.
2002/0148474 A1 10/2002 Larson
2003/0009952 A1 1/2003 Gallant et al.
2003/0014821 A1 1/2003 Boyd
2003/0030319 A1 2/2003 Clapper
2003/0041379 A1 3/2003 Habboub et al.
2003/0061663 A1 4/2003 Lampel
2003/0066134 A1 4/2003 Chapman
2003/0159212 A1 8/2003 Patrick et al.
2003/0205920 A1 11/2003 Sprouse et al.
2004/0083550 A1 5/2004 Graebe, Jr.
2004/0123382 A1 7/2004 Berge
2004/0237203 A1 12/2004 Romano et al.
2005/0005358 A1 1/2005 Dudonis
2005/0028273 A1 2/2005 Weedling et al.
2005/0034242 A1 2/2005 Davis
2005/0055768 A1 3/2005 Assink
2005/0076437 A1 4/2005 Johnson
2005/0091749 A1 5/2005 Humbles
2005/0102750 A1 5/2005 Berge
2005/0151410 A1 7/2005 Sprouse, II
2005/0210595 A1 9/2005 Di Stasio et al.
2005/0229314 A1 10/2005 Chisari
2005/0235423 A1 10/2005 Hetzel et al.
2006/0000016 A1 1/2006 Weedling et al.
2006/0072347 A1 4/2006 Ferraro
2006/0162086 A1 7/2006 Davis
2006/0213010 A1 9/2006 Davis
2007/0006388 A1 1/2007 Townsend
2007/0072690 A1 3/2007 Berenson et al.
2007/0074760 A1 4/2007 Wu
2007/0118993 A1 5/2007 Bates
2007/0266494 A1 11/2007 Deluca et al.
2007/0283498 A1 12/2007 Shelby
2008/0022461 A1 1/2008 Bartlett et al.
2008/0028516 A1 2/2008 Morishima
2008/0029940 A1 2/2008 Kammer et al.
2008/0078033 A1 4/2008 Wyatt et al.
2008/0209630 A1 9/2008 Kazala et al.
2008/0216231 A1 9/2008 Lambarth et al.
2008/0289102 A1 11/2008 Davis
2009/0000037 A1 1/2009 Graebe, Jr.
2009/0211168 A1 8/2009 Bogar
2009/0265857 A1 10/2009 Habegger
2009/0295203 A1 12/2009 Lewis et al.
2010/0257703 A1 10/2010 Vass
2010/0290931 A1 11/2010 Sanders et al.
2011/0035880 A1 2/2011 Cole et al.
2011/0056017 A1 3/2011 Schreiber et al.
2011/0068939 A1 3/2011 Lachenbruch
2011/0072579 A1 3/2011 Receveur et al.
2011/0219546 A1 9/2011 West
2011/0247725 A1 10/2011 Frayne et al.
2011/0271444 A1 11/2011 Davis
2011/0277234 A1 11/2011 Jasani
2011/0296609 A1 12/2011 Giap
2011/0304186 A1 12/2011 Andrews
2012/0009844 A1 1/2012 Waters et al.
2012/0073053 A1 3/2012 Turner et al.
2012/0085430 A1 4/2012 Johansson et al.
2012/0124752 A1 5/2012 Patrick
2012/0131746 A1 5/2012 Griffin et al.
2012/0144594 A1 6/2012 Nash
2012/0186012 A1 7/2012 Ponsi et al.
2012/0186013 A1 7/2012 Ponsi
2012/0186587 A1 7/2012 Steffens et al.
2012/0210511 A1 8/2012 Davis
2012/0245500 A1 9/2012 Polliack et al.
2012/0255124 A1 10/2012 West
2012/0292958 A1 11/2012 Sprouse, II
2012/0304384 A1 12/2012 Scholz et al.
2012/0311783 A1 12/2012 Chiang et al.
2013/0019882 A1 1/2013 Durham et al.
2013/0042409 A1 2/2013 Gil Gomez et al.
2013/0042414 A1 2/2013 Schreiber et al.
2013/0104907 A1 5/2013 Giap
2013/0145549 A1 6/2013 Piegdon et al.
2013/0152950 A1 6/2013 Giap
2013/0205495 A1 8/2013 Ponsi et al.
2013/0263377 A1 10/2013 Wootten
2013/0269111 A1* 10/2013 Berg .................... A47G 9/1027
112/475.08
2013/0270881 A1 10/2013 Fowler et al.
2013/0318723 A1 12/2013 Li
2013/0320746 A1 12/2013 Amirault et al.
2013/0340772 A1 12/2013 Carlson et al.
2014/0007351 A1 1/2014 Cohen
2014/0082836 A1 3/2014 Patrick et al.
2014/0250601 A1 9/2014 Gomez
2014/0277307 A1 9/2014 Gammons et al.
2014/0283305 A1* 9/2014 Zysman ............... A47C 27/148
5/636
2014/0304918 A1 10/2014 Steffens et al.
2014/0338121 A1 11/2014 Giap
2014/0352072 A1 12/2014 Holladay
2015/0040326 A1 2/2015 Fairburn et al.
2015/0113735 A1 4/2015 Anderson et al.
2015/0122266 A1 5/2015 Saunders et al.
2015/0189996 A1 7/2015 Scarlett et al.
2015/0224217 A1 8/2015 Rogers
2015/0225097 A1 8/2015 Anastasia
2015/0238378 A1 8/2015 Bhat et al.
2015/0289817 A1 10/2015 Augustine et al.
2015/0290027 A1 10/2015 Augustine et al.
2015/0290062 A1 10/2015 Augustine et al.
2015/0335165 A1 11/2015 Creekmuir et al.
2015/0369384 A1 12/2015 Frayne
2016/0095777 A1 4/2016 Berman
2016/0228281 A1 8/2016 Marshall et al.
2016/0245439 A1 8/2016 Fry
2016/0279007 A1 9/2016 Flatt
2017/0049646 A1 2/2017 Rigoni et al.
2017/0049647 A1 2/2017 Rigoni et al.
2017/0112655 A1 4/2017 Giap
2017/0119608 A1 5/2017 Rigoni et al.
2017/0216117 A1 8/2017 Rigoni et al.
2017/0231410 A1* 8/2017 Chon ....................... A47G 9/10
5/640
2017/0239118 A1 8/2017 Cole et al.
2017/0326011 A1 11/2017 Alvarez et al.
2018/0017177 A1 1/2018 Marson et al.
2018/0140457 A1 5/2018 Sarma
2018/0192960 A1 7/2018 Augustine et al.
2018/0200130 A1 7/2018 Liu
2018/0221229 A1 8/2018 Kaiser et al.
2018/0221242 A1 8/2018 Lee et al.
2018/0289174 A1 10/2018 Ye et al.
2018/0303690 A1 10/2018 Hahn et al.
2018/0311097 A1 11/2018 Rodzewicz et al.
2018/0353360 A1 12/2018 Kea et al.
2018/0369050 A1 12/2018 Davis et al.
2019/0046382 A1 2/2019 Fiset et al.
2019/0049027 A1 2/2019 Bais
2019/0059603 A1 2/2019 Griffith et al.
2019/0083341 A1 3/2019 Ulreich et al.
2019/0104996 A1 4/2019 Augustine et al.
2019/0151177 A1 5/2019 Giap
2019/0159843 A1 5/2019 Demri et al.
2019/0358102 A1 11/2019 Ueda
2020/0008976 A1 1/2020 Molloy et al.
2020/0060912 A1 2/2020 Hollabaugh et al.
2020/0100606 A1* 4/2020 Ganji ..................... A47G 9/109
2021/0093498 A1 4/2021 Lafleche et al.
2021/0275371 A1 9/2021 Fowler et al.
2021/0401076 A1 12/2021 Jenkins et al.

(56) References Cited

U.S. PATENT DOCUMENTS

| | | | |
|---|---|---|---|
| 2022/0000692 | A1 | 1/2022 | Gomez |
| 2022/0023121 | A1 | 1/2022 | Davis |
| 2022/0096304 | A1 | 3/2022 | Kaiser et al. |
| 2022/0323283 | A1 | 10/2022 | Boulos et al. |
| 2023/0011458 | A1 | 1/2023 | Parikh et al. |
| 2023/0064553 | A1 | 3/2023 | Fogel et al. |
| 2024/0156661 | A1 | 5/2024 | Kaforey |
| 2024/0156662 | A1 | 5/2024 | Kaforey et al. |

FOREIGN PATENT DOCUMENTS

| | | | |
|---|---|---|---|
| CN | 211326149 | U | 8/2020 |
| DE | 10 2010 007 457 | | 8/2011 |
| EP | 3 162 347 | A1 | 5/2017 |
| FR | 2923367 | A1 | 5/2009 |
| GB | 2 300 845 | A | 11/1996 |
| GB | 2 402 075 | A | 12/2004 |
| GB | 2 415 912 | | 1/2006 |
| JP | 10-117907 | A | 5/1998 |
| SE | 527345 | C2 | 2/2006 |
| WO | WO-88/10082 | A1 | 12/1988 |
| WO | WO-96/27357 | A1 | 9/1996 |
| WO | WO-02/065877 | A1 | 8/2002 |
| WO | WO-2004/050002 | A1 | 6/2004 |
| WO | WO-2005/007673 | | 1/2005 |
| WO | WO-2005/086664 | A2 | 9/2005 |
| WO | WO-2005/107673 | A1 | 11/2005 |
| WO | WO-2012/001423 | | 1/2012 |
| WO | WO-2012/170934 | A2 | 12/2012 |
| WO | WO-2015/081233 | A1 | 6/2015 |
| WO | WO-2015/081271 | A2 | 6/2015 |
| WO | WO-2017/185039 | A2 | 10/2017 |
| WO | WO-2017/197326 | A1 | 11/2017 |
| WO | WO-2019/060424 | A1 | 3/2019 |
| WO | WO-2019/152624 | A1 | 8/2019 |
| WO | WO-2020/041493 | A1 | 2/2020 |
| WO | WO-2020/136796 | A1 | 7/2020 |

OTHER PUBLICATIONS

May 15, 2014—(WO) International Search Report and Written Opinion—App PCT/US12/22572, 25 pages.
Nov. 28, 2014—(EP) Search Report—App 14159820.1.
Jun. 25, 2015—(EP) Extended Search Report—App 12739957.4.
May 15, 2015—(WO) International Search Report and Written Opinion—App PCT/US2014/067672.
Immedia OneWayGlide Rehab Assist, Jun. 15, 2004 http://www.rehabassist.com.au/immedia.htm.
OneWayGlide Instruction for Use, Immedia, Version 6, 2016, p. 7.
Prism Medical Company, 5300 Ergoglide Instructions, 2009, 2 pp. Maryland Heights, MO.
Romedic OneWaySlide, Handicare, Dec. 6, 2010.
Textbook of Palliative Nursing, Nov. 10, 2005, Oxford University Press, XP002740850, 1 page.
Waverley Glen, One-Way Glide—The Grimstead Range of Transfer and Repositioning Aids, Ontario Canada, downloaded Jun. 11, 2012, 3 pages.
"Boost" Definition in the Cambridge English Dictionary, Non-Final Office Action mailed on May 11, 2021, for U.S. Appl. No. 16/547,343.
"How to Set Up Kool Kat", Aug. 11, 2013, SKY High Amusements, Minutes 1:55-2:30, http://www.youtube.com/watch?v=a966cR6v6sc (Year: 2013).
Dec. 31, 2013—U.S. Final Office Action—U.S. Appl. No. 13/014,497.
Jul. 2, 2013—U.S. Non-Final Office Action—U.S. Appl. No. 13/014,497.
Mar. 20, 2013—U.S. Non-Final Office Action—U.S. Appl. No. 13/014,500.
Mar. 28, 2014—U.S. Non-Final Office Action—U.S. Appl. No. 13/156,103.
Sep. 14, 2015—U.S. Non-Final Office Action—U.S. Appl. No. 13/838,952.
Mar. 14, 2016—(EP) Office Action—App 12739957.4.
Blaine Miller, Provisional Draft Declaration, U.S. Pat. No. 8,511,314, Reexamination Control No. 90/013,087, published Dec. 18, 2018, 11 pages.
Church et al., "Burn Wound Infections", Clinical Microbiology Reviews, 2006, vol. 19, No. 2, pp. 403-343.
Coleman Quick Pump Fitting Replacement Nozzle Main Adapter and Pinch Valve Tip, Sep. 6, 2014, Amazon.com, https://www.amazon.com/Coleman-Fitting-Replacement-Nozzle-Adapter/dp/B00JHRJ03A/ref=cm_cr_arp_d_product_top?ie=UTF8.
Communication pursuant to Article 94(3) EPC for EP Application No. 12728152.5 date Apr. 22, 2015, 5 pages.
Craig Kaforey, Declaration, U.S. Pat. No. 8,511,314, Reexamination Control No. 90/013,087, published Sep. 10, 2014, 13 pages.
Craig Kaforey, Declaration, U.S. Pat. Nos. 8,511,314 and 8,464,720, Reexamination Control Nos. 90/013,088 and 90/013,088, published Apr. 18, 2014, 3 pages.
Craig Kaforey, Declaration, U.S. Pat. Nos. 8,511,314 and 8,464,720, Reexamination Control Nos. 90/013,088 and 90/013,088, published Sep. 10, 2014, 6 pages.
Dr. Alessio Pigazzi, Declaration, U.S. Pat. Nos. 8,511,314 and 8,464,720, Reexamination Control Nos. 90/013,088 and 90/013,088, published Sep. 10, 2014, 30 pages.
Dr. Gustavo Plasencia, Declaration, U.S. Pat. Nos. 8,511,314 and 8,464,720, Reexamination Control Nos. 90/013,088 and 90/013,088, published Sep. 10, 2014, 28 pages.
Dr. Maheswari Senthil, Declaration, U.S. Pat. No. 8,511,314, Reexamination Control No. 90/013,087, published Apr. 18, 2014, 18 pages.
Dr. Thomas Ljungman, Declaration, U.S. Pat. Nos. 8,511,314 and 8,464,720, Reexamination Control Nos. 90/013,088 and 90/013,088, published Sep. 10, 2014, 9 pages.
Examination Report No. 1 for AU App. No. 2019325331, issued Jul. 11, 2024, 3 pages.
Examination Report No. 1 for AU Application No. 2018285855, mailed Mar. 16, 2023, 3 pages.
Examination Report No. 1 for Australian Application No. 2017252576 dated Feb. 14, 2019, 5 pages.
Examination Report No. 1 on AU 2021209239 DTD Apr. 2, 2022 (4 pages).
Examination Report No. 3 for AU Application No. 2021209239, mailed Feb. 20, 2023, 7 pages.
Examination Report No. 4 for AU Application No. 2021209239, mailed Mar. 24, 2023, 3 pages.
Extended European Search Report for EP Application No. 19151698.8, dated Apr. 17, 2019, 6 pages.
Glenn E. Beltz, Affidavit, U.S. Pat. Nos. 8,511,314 and 8,464,720, Reexamination Control Nos. 90/013,088 and 90/013,088, published Sep. 10, 2014, 19 pages.
Gustavo Plasencia, Declaration, U.S. Pat. No. 8,511,314, Reexamination Control No. 90/013,087, published Apr. 18, 2014, 29 pages.
HoverTech International, HoverMatt PROS (Patent Repositioning Off-Loading System), (2024), URL: https://hovermatt.com/products/hovermatt-pros-patient-repositioning-off-loading-system/.
HoverTech International, HoverMatt PROS Air on Vimeo, Feb. 23, 2024, URL: https://vimeo.com/916140683.
HoverTech International, HoverMatt PROS Animation on Vimeo, Mar. 2024, URL: https://vimeo.com/920124419.
HoverTech International, HoverMatt PROS on Vimeo, Feb. 23, 2024, URL: https://vimeo.com/916142851.
Hovertech, HoverMatt PROS, User Manual Rev C 11724, Mar. 2024, URL: https://hovermatt.com/wp-content/uploads/2024/03/Hov_PROSManual-RevC-11724.pdf.
International Preliminary Report on Patentability for International Application No. PCT/US2017/028954, issued Oct. 23, 2018, 9 pages.
International Preliminary Report on Patentability for International Application No. PCT/US2022/018215, mailed Oct. 19, 2023, 10 pages.
International Preliminary Report on Patentability for PCT Application No. PCT/US2014/067672 dated May 31, 2016, 12 pages.

(56) References Cited

OTHER PUBLICATIONS

International Search Report and Written Opinion for International Application No. PCT/US2017/028954, mailed Nov. 24, 2017, 16 pages.
International Search Report and Written Opinion for International Application No. PCT/US2018/037372, mailed Sep. 13, 2018, 13 pages.
International Search Report and Written Opinion for International Application No. PCT/US2019/047540, mailed Nov. 14, 2019, 13 pages.
International Search Report and Written Opinion for International Application No. PCT/US2022/018215, mailed Aug. 9, 2022, 18 pages.
Jennifer Klauschie et al., "Use of Anti-Skid Material and Patient-Positioning to Prevent Patient Shifting during Robotic-Assisted Gynecologic Procedures," J. Minim Invasive Gynecol., 2010; 17(4):504-507.
Michael Madigan, Affidavit, U.S. Pat. Nos. 8,511,314 and 8,464,720, Reexamination Control Nos. 90/013,088 and 90/013,088, published Sep. 10, 2014, 32 pages.
Paul Lloyd, Declaration, U.S. Pat. Nos. 8,511,314 and 8,464,720, Reexamination Control Nos. 90/013,088 and 90/013,088, published Sep. 10, 2014, 4 pages.
Photos of Stryker Glide holding strap, date unknown, two pages.
Record of Oral Hearing held Dec. 14, 2015, Appeal No. 2015-007832, Reexamination Control No. 90/013,088, mailed Jan. 4, 2016.
Soule Medical, Patient Positioning Systems Product Catalog, published Jan. 1, 2015, 63 pages.
Stryker Operations/Maintenance Manual for Stryker Glide Lateral Air Transfer System, Model 3062, date unknown, 33 pages.

* cited by examiner

METHOD AND DEVICE FOR TURNING AND POSITIONING A PATIENT USING FILLABLE CHAMBERS

CROSS-REFERENCE TO RELATED APPLICATIONS

This application is a divisional of U.S. patent application Ser. No. 17/733,422, filed Apr. 29, 2022, which claims the benefit of and priority to U.S. Provisional Patent Application No. 63/217,631, filed Jul. 1, 2021, and U.S. Provisional Patent Application No. 63/182,504, filed Apr. 30, 2021, the entire disclosures of which are hereby incorporated by reference herein.

BACKGROUND

The present disclosure relates generally to an apparatus, system, and method for positioning a patient, and in particular for turning and supporting a patient.

When a patient is unconscious, disabled, or otherwise unable to move under their own power, caregivers often "turn" patients in order to avoid pressure ulcers from forming on the patient's torso. Turning a patient often involves repositioning the patient from side-to-side, every two hours, in order to reduce the risk of injury from localized pressure. However, a patient can slide out of position, thus increasing the patient's risk of developing a pressure ulcer. Furthermore, turning and supporting the patient is labor intensive and can place the caregivers at risk of injury.

The present disclosure seeks to overcome certain of these limitations and other drawbacks of existing devices, systems, and methods, and to provide new features not heretofore available.

SUMMARY

One aspect of the present disclosure relates to an inflatable device. The inflatable device includes a first layer of material and a second layer of material coupled together around at least a peripheral edge, where at least one cavity is formed between the first layer and the second layer. The inflatable device further includes at least one input port for receiving air to inflate the at least one cavity, where the inflatable device is configured such that when the at least one cavity is inflated, a turning wedge and a support bolster are formed.

In various embodiments, the first layer is further attached to the second layer along a first longitudinal attachment line and along a second longitudinal attachment line, spaced apart from the first longitudinal attachment line such that the turning wedge is formed between a first peripheral side edge and the first longitudinal attachment line and the support bolster is formed between a second peripheral side edge and the second longitudinal attachment line. In some embodiments, a distance between the first peripheral side edge and the first longitudinal attachment line is greater than a distance between the second peripheral side edge and the second longitudinal attachment line such that the turning wedge inflates to a greater height than the support bolster. In other embodiments, the distance between the first peripheral side edge and the first longitudinal attachment line is 16 inches and the distance between the second peripheral side edge and the second longitudinal attachment line is 11 inches. In yet other embodiments, a distance between the first longitudinal attachment line and the second longitudinal attachment line forms a valley between the turning wedge and the support bolster. In various embodiments, the at least one cavity includes a first cavity forming the turning wedge and a second cavity forming the support bolster. In some embodiments, the inflatable device also includes a third layer of material coupled to the first layer of material and the second layer of material around at least the peripheral edge, where at least one lower cavity is formed between the second layer and the third layer, and where the inflatable device is further configured such that when the at least one lower cavity is inflated, a second turning wedge and a second support bolster are formed. In other embodiments, the inflatable device is configured such that when the at least one cavity is inflated, a patient laying on the inflatable device is turned towards a first lateral side and when the at least one lower cavity is inflated, the patient is turned towards a second lateral side without adding or removing any structures under the patient. In yet other embodiments, the inflatable device further includes a first input port for inflating the at least one cavity and a second input port for inflating the at least one lower cavity.

In various embodiments, the third layer is further attached to the second layer along a third longitudinal attachment line and along a fourth longitudinal attachment line, spaced apart from the third longitudinal attachment line such that the second turning wedge is formed between a first peripheral side edge and the third longitudinal attachment line and the second support bolster is formed between a second peripheral side edge and the fourth longitudinal attachment line. In some embodiments, a distance between the first peripheral side edge and the third longitudinal attachment line is greater than a distance between the second peripheral side edge and the fourth longitudinal attachment line such that the second turning wedge inflates to a greater height than the second support bolster. In other embodiments, a distance between the first peripheral side edge and the third longitudinal attachment line is 16 inches and a distance between the second peripheral side edge and the fourth longitudinal attachment line is 11 inches. In yet other embodiments, a distance between the third longitudinal attachment line and the fourth longitudinal attachment line forms a valley between the second turning wedge and the second support bolster. In various embodiments, the at least one lower cavity includes a first lower cavity forming the second turning wedge and a second lower cavity forming the second support bolster. In some embodiments, the first turning wedge is on a first side of the inflatable body, the first support bolster is on a second side of the inflatable device, the second support bolster is on the first side of the inflatable body, and the second turning wedge is on the second side of the inflatable body, such that the first and second turning wedges are offset and the first and second support bolsters are offset.

Another aspect of the present disclosure relates to a system for repositioning or supporting a patient. The system includes a first sheet, the first sheet configured to receive a patient on a top side. The system further includes a second sheet coupled to the first sheet, where the second sheet includes at least one tubular pocket therein, and wherein the second sheet is configured to contact a support surface The system also includes at least one support device configured to be inserted within the at least one tubular pocket, such that when the at least one support device is inserted within the at least one tubular pocket, at least a portion of the patient is elevated relative to the support surface.

In various embodiments, the second sheet includes at least three pockets. In some embodiments, a first pocket of the at least one tubular pocket is disposed near a top end of the first sheet, the first pocket being configured to form a cushion for a head of the patient. In other embodiments, the at least one support device is at least one pillow, where the at least one pillow includes a pillow case having at least one engagement region, and where the at least one engagement region is configured to engage with the at least one tubular pocket to secure the at least one pillow within the at least one tubular pocket. In yet other embodiments, the top sheet includes one or more retention regions configured to prevent sliding of the patient relative to the top sheet.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
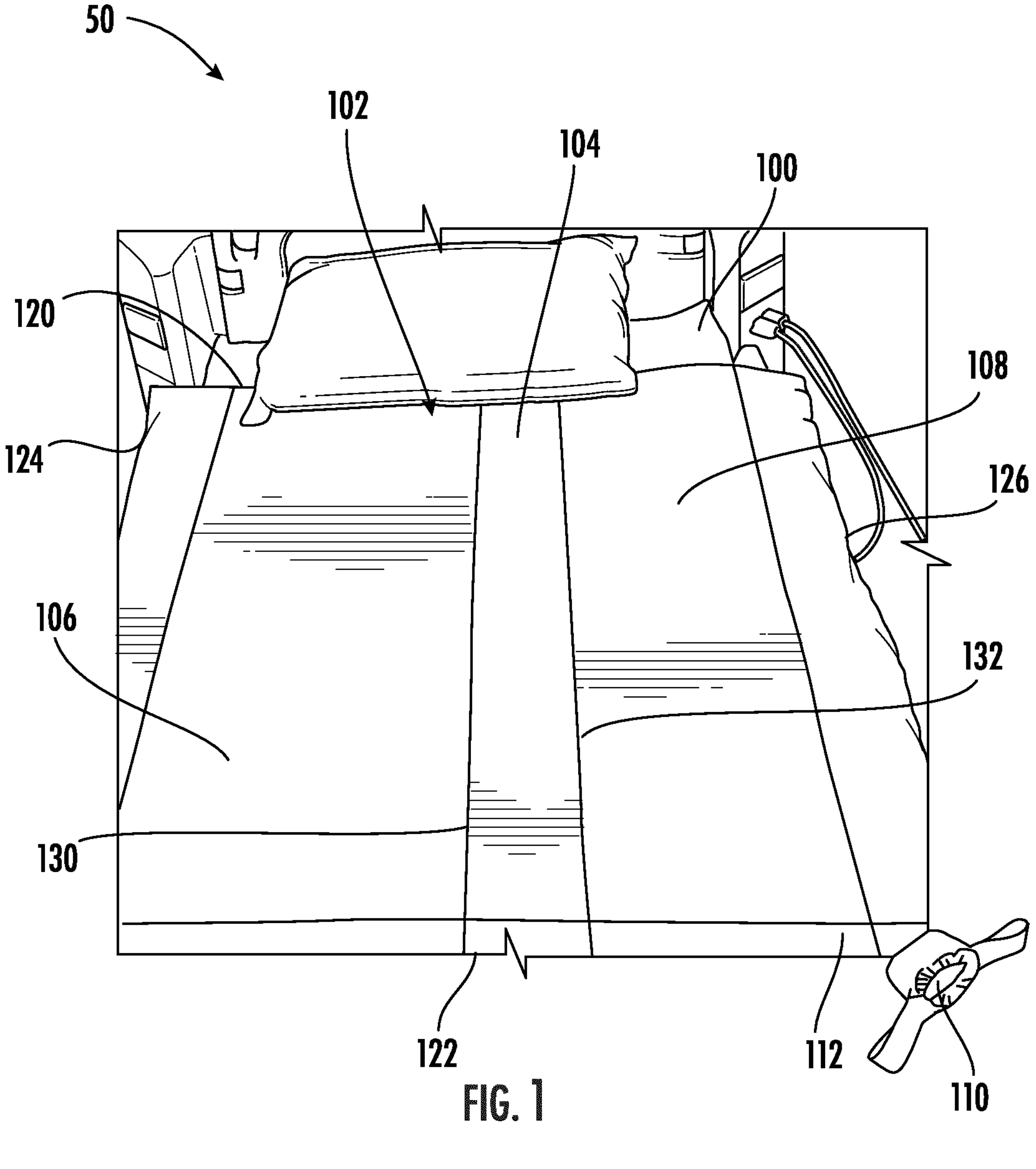
FIG. 1 is a top view of a patient positioning and support system, according to an exemplary embodiment.

Referring to FIG. 1, a patient positioning and support system 50 is shown, according to an exemplary embodiment. As shown in FIG. 1, the patient positioning and support system 50 includes an inflatable patient support device 102 (hereinafter, "inflatable device" 102) lying on a support structure 100. The support structure 100 may be a bed, gurney, stretcher, cot, operating table, or any other support structure for medical and/or patient care use (e.g., for supporting a person in a supine or other position). The support structure 100 is not shown in detail, but may generally include known features of support structures for medical and/or other patient care use (e.g., a frame, the support structure 100 supported by the frame, the support structure 100 including a head, a foot, opposed sides or edges, etc.). Similarly, the support structure 100 may also include other medical components known in the art (e.g., bed sheets, pillows, blankets, additional sheets, etc.). In some embodiments, the support structure 100 is adjustable, such that the support structure 100, or portions thereof, may be raised, lowered, positioned in an incline, positioned in a decline, etc. It should be understood that the patient positioning and support system 50, and the components thereof, may be used with different support structures 100 for use to position and support a patient.

As shown in FIG. 1, the inflatable device 102 may include a first or top inflatable portion 104, having a turning wedge 106 and a support bolster 108, and an inflation port 110. The inflatable device 102 may be flexible and foldable when in the non-inflated state, and may be configured to be positioned on the support structure 100. As discussed in greater detail below, the top inflatable portion 104 may define an internal cavity configured to be inflated with air or another fluidic substance. The top inflatable portion 104 may be defined by at least a first layer 112 forming a top wall of the internal cavity and a second layer 114 (not shown) forming a bottom wall of the internal cavity, with the first layer 112 and the second layer 114 connected to define the cavity. In an exemplary embodiment, the first layer 112 and the second layer 114 are two separate pieces of sheet material that are connected together around their peripheries (e.g., at edges 120-126), such as by stitching, adhesives, or one or more other suitable connection techniques. In some embodiments, the first layer 112 and the second layer 114 may be connected by a side wall, or a plurality of side walls, made from a flexible or ridged material attached to each sheet at their peripheries. In other embodiments, the first layer 112 and the second layer 114 may be made from a single piece of material that is folded over and connected by stitching along the free ends. The first layer 112 and the second layer 114 may have a single layer or multiple layers, and may be formed of the same or different materials (e.g., high-friction materials, low-friction materials, etc.).

As shown in FIG. 1, the inflatable device 102 (i.e., top inflatable portion 104) further includes at least one cavity forming the turning wedge 106 and the support bolster 108. In an exemplary embodiment, the turning wedge 106 and the support bolster 108 are defined by the first layer 112 and the second layer 114 and peripheral edges (e.g., edges 120-126). The turning wedge 106 and the support bolster 108 are further defined by longitudinal attachment lines (e.g., lines 130-132) of the inflatable device 102, as described below. For example, the inflatable device 102 may include peripheral edges, including a head edge 120, a foot edge 122, a first peripheral side edge 124, and a second peripheral side edge 126. Further, the inflatable device 102 may also include longitudinal attachment lines, including a first longitudinal attachment line 130 and a second longitudinal attachment line 132. As shown in FIG. 1, the first layer 112 may be attached to the second layer 114 around the peripheral edges (e.g., edges 120-126), as well as, along the first longitudinal attachment line 130 and the second longitudinal attachment line 132. In this regard, the turning wedge 106 may be defined by the first layer 112 and the second layer 114, between the first peripheral side edge 124 and the first longitudinal attachment line 130 (and the head edge 120 and the foot edge 122). Similarly, the support bolster 108 may be defined by the first layer 112 and the second layer 114, between the second peripheral side edge 126 and the second longitudinal attachment line 132 (and the head edge 120 and the foot edge 122). The top inflatable portion 104 (i.e., the turning wedge 106 and the support bolster 108) is described in greater detail below.

In an exemplary embodiment, the inflatable device 102 may be made of materials that have properties that are desirable for a particular application. For example, the materials may have properties that include favorable breathability, durability, imagining compatibility, flammability, biocompatibility, pressure distribution profile, heat transmission, electrical conductivity, and cleaning properties. In an exemplary embodiment, the inflatable device 102 may be intended to be left beneath the patient for an extended period of time. As such, the first layer 112 and the second layer 114 may be made of breathable fabrics or other materials that have sufficient breathability to allow passage of heat and moisture vapor away from the patient, while also having sufficient resistance to air passage to retain inflation. In other embodiments, a portion of the first layer 112 and/or the second layer 114 may be made of a high-friction material (e.g., non-contact areas) and/or a low-friction material.

Still referring to FIG. 1, the inflatable device 102 may also include an inflation port 110. As shown in FIG. 1, the inflation port 110 may be positioned near a corner of the inflatable device 102 (e.g., at one of the edges 120-126), and may be configured to permit inflation of the inflatable device 102, or more particularly, to inflate the top inflatable portion 104 (e.g., the turning wedge 106 and/or the support bolster 108). In some embodiments, the inflatable device 102 may include a plurality of inflation ports 110, which may be used to separately inflate and/or deflate portions of the inflatable device 102.

Figure 2:
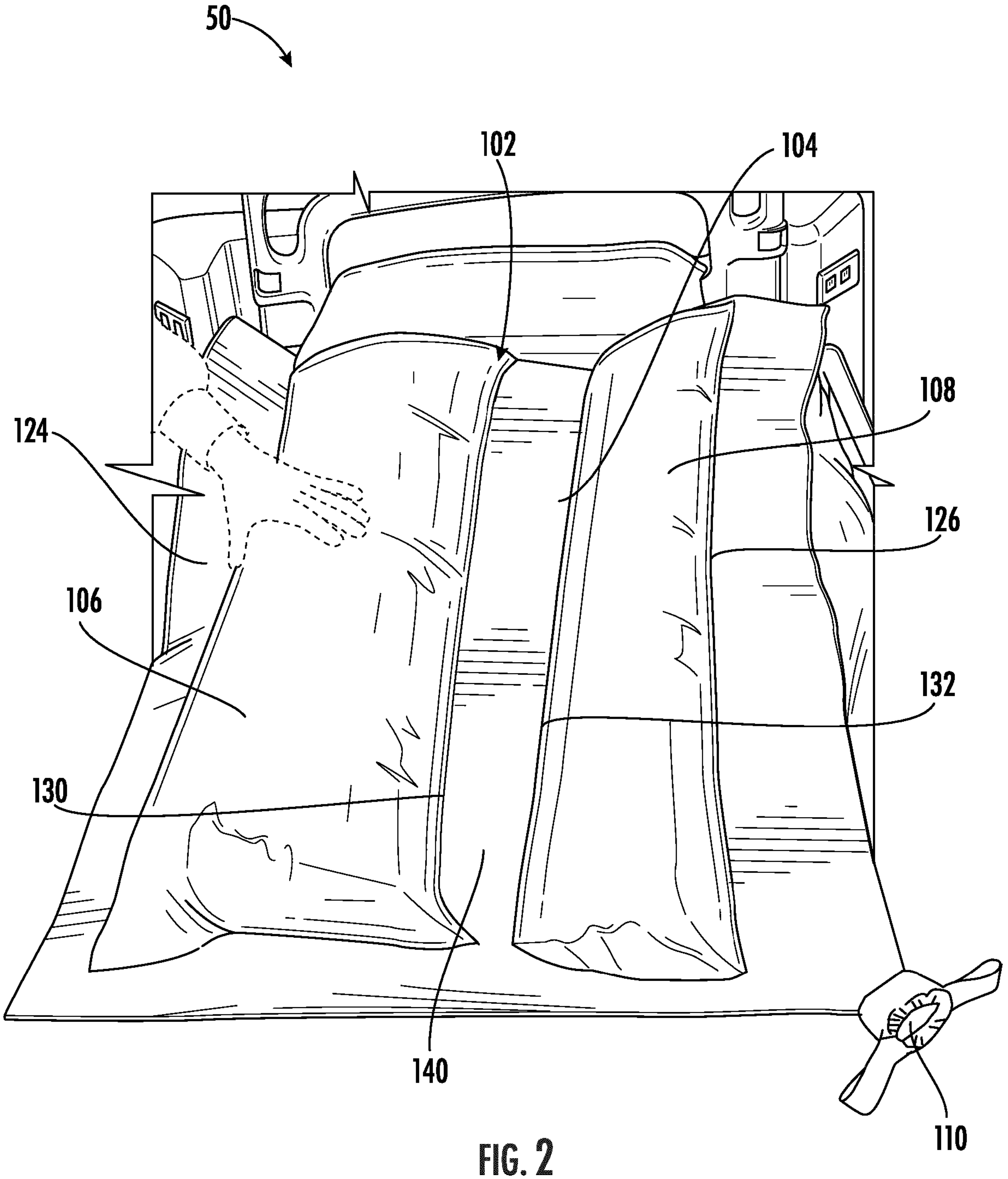
FIG. 2 is another top view of the patient positioning and support system of FIG. 1, according to an exemplary embodiment.

Referring now to FIG. 2, an inflatable device 102 of the patient positioning and support system 50 is shown in an inflated state, according to an exemplary embodiment. When the inflatable device 102 is inflated (e.g., via the inflation port 110), the turning wedge 106 and the support bolster 108 are formed. In one embodiment, one of the turning wedge 106 or the support bolster 108 is inflated first (e.g., via the inflation port 110), then the other of the turning wedge 106 or the support bolster 108 is inflated (e.g., via a port, gap, seal, etc.). In another embodiment, both the turning wedge 106 and the support bolster 108 are inflated at the same time. In yet other embodiments, a first inflation port 110 may be used to inflate/deflate the turning wedge 106, and a second inflation port 110 may be used to inflate/deflate the support bolster 108. It should be understood that any combination of inflation ports 110, and/or processes of inflating and/or deflating the top inflatable portion 104, is contemplated herein.

As shown in FIG. 2, when the top inflatable portion 104 is inflated, the turning wedge 106 may inflate to a greater height (e.g., more volume) than the support bolster 108. In this regard, the distance between the first peripheral side edge 124 and the first longitudinal attachment line 130 is greater than the distance between the second peripheral side edge 126 and the second longitudinal attachment line 132. In an exemplary embodiment, the distance between the first peripheral side edge 124 and the first longitudinal attachment line 130 is 16 inches, and the distance between the second peripheral side edge 126 and the second longitudinal attachment line 132 is 11 inches. In an exemplary embodiment, the first longitudinal attachment line 130 and the second longitudinal attachment line 132 are separated by a distance (e.g., 5 inches), such that when the inflatable device 102 is inflated there is a valley 140 between the turning wedge 106 and the support bolster 108.

Figure 3:
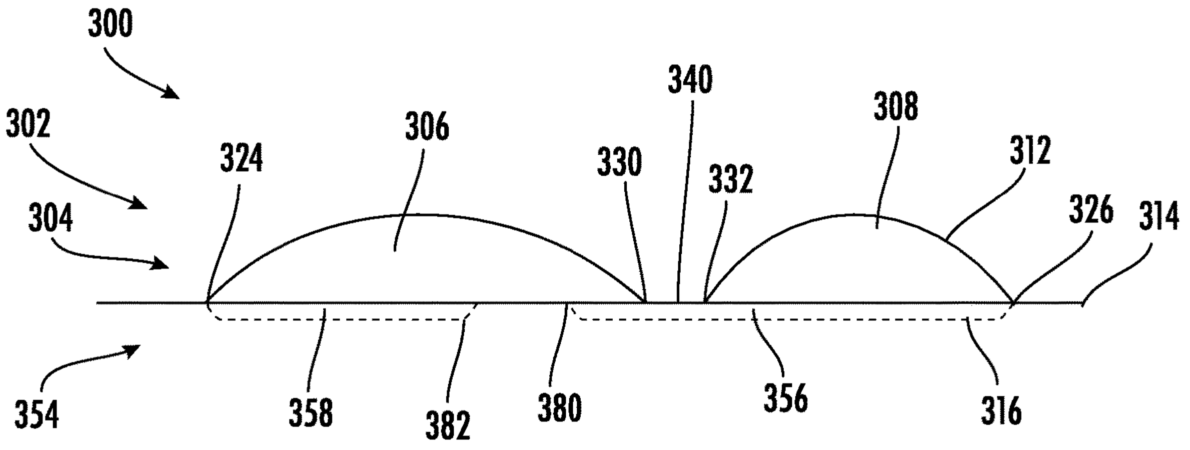
FIG. 3 is an end elevation view of a patient positioning and support system of FIG. 2, according to an exemplary embodiment.

Referring now to FIG. 3, a patient positioning and support system 300 is shown, according to another exemplary embodiment. The patient positioning and support system 300 may be an exemplary embodiment of the patient positioning and support system 50 of FIG. 1. As shown in FIG. 3, the patient positioning and support system 300 includes an inflatable patient support device 302 (hereinafter, "inflatable device" 302).

As shown in FIG. 3, the inflatable device 302 includes a top inflatable portion 304, having a top turning wedge 306 and a top support bolster 308, and a bottom inflatable portion 354, having a bottom turning wedge 356 and a bottom support bolster 358. As discussed above with regard to FIG. 1, the top inflatable portion 304 may define a top internal cavity configured to be inflated with air. Further, the top inflatable portion 304 is defined by at least a first layer 312 forming a top wall of the top internal cavity and a second layer 314 forming a bottom wall of the top internal cavity, with the first layer 312 and the second layer 314 connected to define the top cavity (as discussed above). The inflatable device 302 also includes a first peripheral side edge 324 and a second peripheral side edge 326, as well as, a first longitudinal attachment line 330 and a second longitudinal attachment line 332. As shown in FIG. 3, the first layer 312 may be attached to the second layer 314 (and/or a third layer 316) around the peripheral edges (e.g., edges 324-326), as well as, along the first longitudinal attachment line 330 and the second longitudinal attachment line 332. In this regard, the top turning wedge 306 may be defined by the first layer 312 and the second layer 314, between the first peripheral side edge 324 and the first longitudinal attachment line 330. Similarly, the top support bolster 308 may be defined by the first layer 312 and the second layer 314, between the second peripheral side edge 326 and the second longitudinal attachment line 332. Further, as shown in FIG. 3, when the inflatable device 302 is inflated, the top turning wedge 306 and the top support bolster 308 may be inflated, creating a top valley 340.

As shown in FIG. 3, the inflatable device 302 also includes the second or bottom inflatable portion 354, having the bottom turning wedge 356 and the bottom support bolster 358. Similar to the top inflatable portion 304, the bottom inflatable portion 354 may define a bottom cavity ("lower cavity") configured to be inflated with air. The bottom inflatable portion 354 may be defined by at least the second layer 314 forming a top wall of the bottom internal cavity and a third layer 316 forming a bottom wall of the bottom internal cavity, with the second layer 314 and the third layer 316 connected to define the bottom cavity (as discussed above). The inflatable device 302 may also include a third longitudinal attachment line 380 and a fourth longitudinal attachment line 382. As shown in FIG. 3, the third layer 316 may be attached to the second layer 314 (and/or the first layer 312) around the peripheral edges (e.g., edges 324-326), as well as, along the third longitudinal attachment line 380 and the fourth longitudinal attachment line 382. In this regard, the bottom turning wedge 356 may be defined by the third layer 316 and the second layer 314, between the second peripheral side edge 326 and the third longitudinal attachment line 380. Similarly, the bottom support bolster 358 may be defined by the third layer 316 and the second layer 314, between the first peripheral side edge 324 and the fourth longitudinal attachment line 382. As shown in FIG. 3, in some embodiments when the top inflatable portion 304 is inflated (e.g., top turning wedge 306 and top support bolster 308), the bottom inflatable portion 354 can be deflated.

Still referring to the embodiment of FIG. 3, when the top inflatable portion 304 is inflated, the top turning wedge 306 inflates to a greater height (e.g., more volume) than the top support bolster 308. As discussed with regard to FIG. 1, the distance between the first peripheral side edge 324 and the first longitudinal attachment line 330 is greater than the distance between the second peripheral side edge 326 and the second longitudinal attachment line 332. In an exemplary embodiment, the distance between the first peripheral side edge 324 and the first longitudinal attachment line 330 is 16 inches, and the distance between the second peripheral side edge 326 and the second longitudinal attachment line 332 is 11 inches. Also in a preferred embodiment, the first longitudinal attachment line 330 and the second longitudinal attachment line 332 may be separated by a distance (e.g., 5 inches), such that when the inflatable device 302 is inflated there is a top valley 340 between the top turning wedge 306 and the top support bolster 308.

Figure 4:
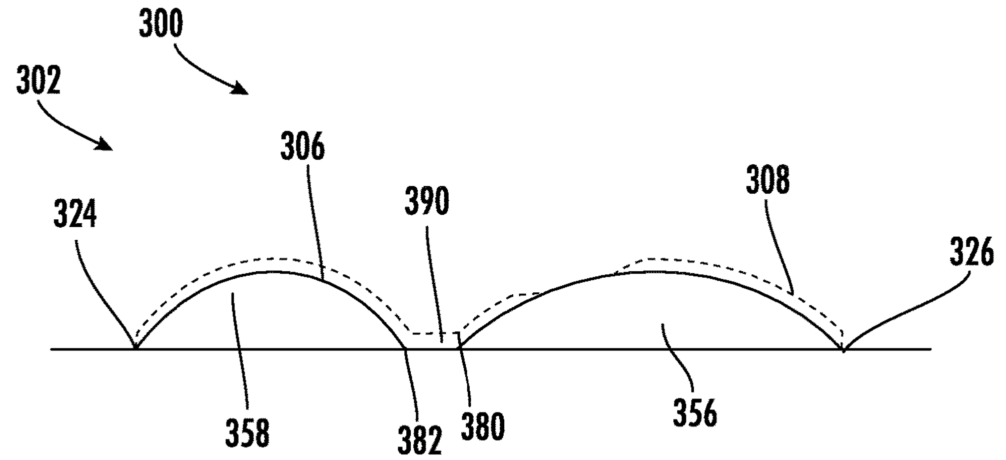
FIG. 4 is another end elevation view of the patient positioning and support system of FIG. 2, according to an exemplary embodiment.

Referring now to FIG. 4, when the bottom inflatable portion 354 is inflated, the top inflatable portion 304 is preferably deflated. As shown in FIG. 4, when the bottom inflatable portion 354 is inflated the bottom turning wedge 356 may inflate to a greater height (e.g., more volume) than the bottom support bolster 358. In this regard, the distance between the second peripheral side edge 326 and the third longitudinal attachment line 380 is greater than the distance between the first peripheral side edge 324 and the fourth longitudinal attachment line 382. In an exemplary embodiment, the distance between the second peripheral side edge 326 and the third longitudinal attachment line 380 is 16 inches, and the distance between the first peripheral side edge 324 and the fourth longitudinal attachment line 382 is 11 inches. As discussed above, other combinations and distances are contemplated herein. Further, in an exemplary embodiment, the third longitudinal attachment line 380 and the fourth longitudinal attachment line 382 may be separated by a distance (e.g., 5 inches), such that when the bottom inflatable portion 354 is inflated there is a bottom valley 390 between the bottom turning wedge 356 and the bottom support bolster 358.

As shown in FIGS. 3-4, the top turning wedge 306 and the bottom support bolster 358 are positioned on the first side of the inflatable device 302. Conversely, the top support bolster 308 and the bottom turning wedge 356 are positioned on a second side of the inflatable device 302. In this regard, the top turning wedge 306 and the bottom turning wedge 356 are positioned on opposite sides of the inflatable device, and the top support bolster 308 and the bottom support bolster 358 are positioned on opposite sides of the inflatable device 302, in order to allow for turning a patient from one side to another.

Figure 5:
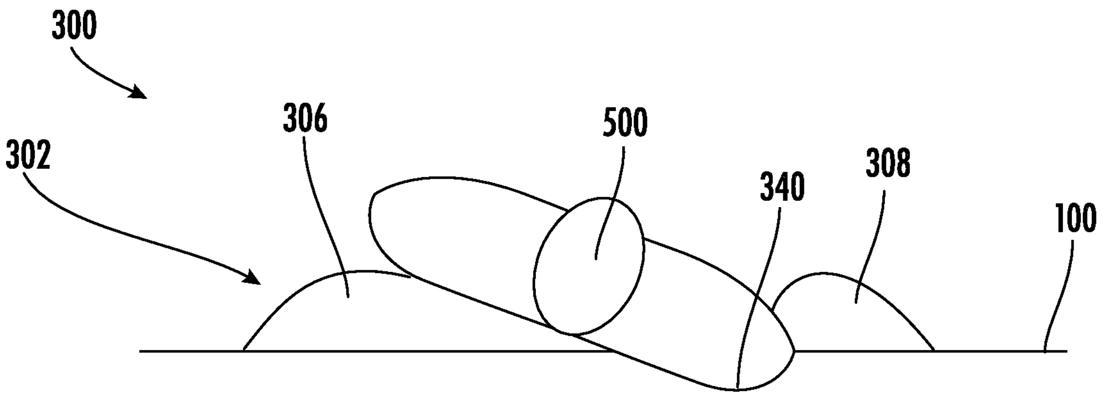
FIG. 5 is an end elevation view of a patient positioned in the patient positioning and support system of FIG. 2, according to an exemplary embodiment.
Figure 6:
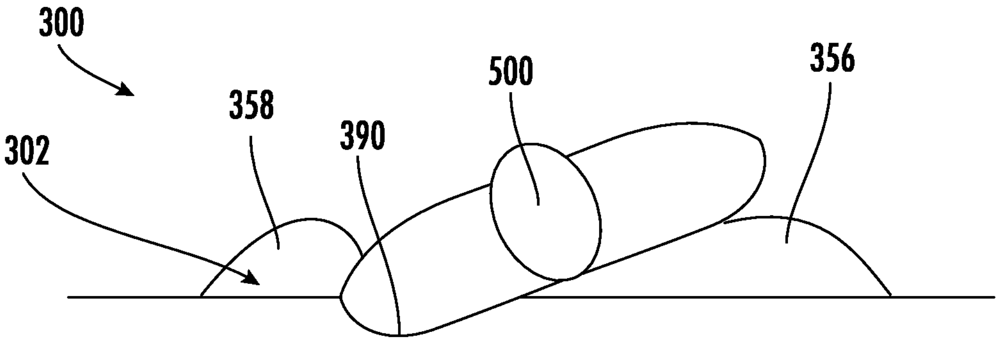
FIG. 6 is another end elevation view of a patient positioned in the patient positioning and support system of FIG. 2, according to an exemplary embodiment.

Referring now to FIGS. 5-6, a process of positioning a patient using the patient positioning and support system 300 is shown, according to an exemplary embodiment. The process discussed in FIGS. 5-6 may utilize the components of the patient positioning and support system 300 described in FIGS. 3-4.

Referring to FIG. 5, a patient positioned on the patient positioning and support system 300 is shown, according to an exemplary embodiment. As shown in FIG. 5, a patient 500 is positioned on the inflatable device 302 (on the support structure 100). In an exemplary embodiment, the patient 500 is initially positioned on the inflatable device 302 when the inflatable device 302 is deflated. Once the patient 500 is properly positioned, an inflation device (such as an air pump) may be used to inflate the inflatable device 302 (e.g., via the inflation port 110). As discussed briefly with regard to FIG. 3, as the inflatable device 302 inflates (e.g., the top inflatable portion 304), the top turning wedge 306 and/or the top support bolster 308 are inflated. In some embodiments, the top turning wedge 306 and the top support bolster 308 inflate at different times. In other embodiments, the top turning wedge 306 and the top support bolster 308 inflate at the same time. As shown in FIG. 5, when the top turning wedge 306 and the top support bolster 308 are sufficiently inflated, the patient 500 is moved into a tilted position (e.g., rolled, turned, etc.) on the inflatable device 302, such that a first side of the patient 500 may be positioned on the top turning wedge 306, while a second side of the patient 500 is supported by the top support bolster 308. In addition, a portion of the body of the patient 500 may also be positioned in the top valley 340 of the inflatable device 302 (and supported by the top support bolster 308), such that the inflatable device 302 resists against the patient 500 moving or sliding.

Referring now to FIG. 6, another view of the patient 500 positioned on the patient positioning and support system 300 is shown, according to an exemplary embodiment. As briefly discussed above, sometimes it may be desirable for a healthcare provider to reposition (e.g., roll, turn, etc.) a patient during the course of certain medical procedures and/or patient care cases. In this regard, after positioning the patient 500 as described in FIG. 5, a healthcare provider may desire to reposition (e.g., turn or roll) the patient 500 using the inflatable device 302.

As discussed above with regard to FIGS. 3-4, the inflatable device 302 may be inflated and/or deflated in various ways. For example, in one embodiment the top inflatable portion 304 (e.g., the top turning wedge 306 and/or the top support bolster 308) may be deflated (e.g., via the inflation port 110), while the bottom inflatable portion 354 (e.g., the bottom turning wedge 356 and/or the bottom support bolster 358) is inflated (e.g., via the inflation port 110). In other embodiments, the bottom inflatable portion 354 may be inflated, which may force (e.g., via pressure) the top inflatable portion 304 to deflate. In yet other embodiments, a plurality of inflation ports 110 may be used to deflate and/or inflate the top inflatable portion 304 and/or the bottom inflatable portion 354. As discussed above, any combination of inflation ports 110 and/or inflation and deflation processes are contemplated herein.

As shown in FIG. 6, when the bottom inflatable portion 354 (e.g., the bottom turning wedge 356 and the bottom support bolster 358) is sufficiently inflated, and the top inflatable portion 304 is sufficiently deflated, the patient 500 may be repositioned (e.g., rolled, turned, etc.). In this regard, the patient 500 may be "rolled" (i.e., repositioned to their other side), such that the second side of the patient 500 may be positioned on the bottom turning wedge 356, while the first side of the patient 500 is supported by the bottom support bolster 358. Similar to what was discussed with regard to FIG. 5, a portion of the body of the patient 500 may also be positioned in the bottom valley 390 (and supported by the bottom support bolster 358), such that the inflatable device 302 may resist against the patient 500 moving or sliding.

Figure 7:
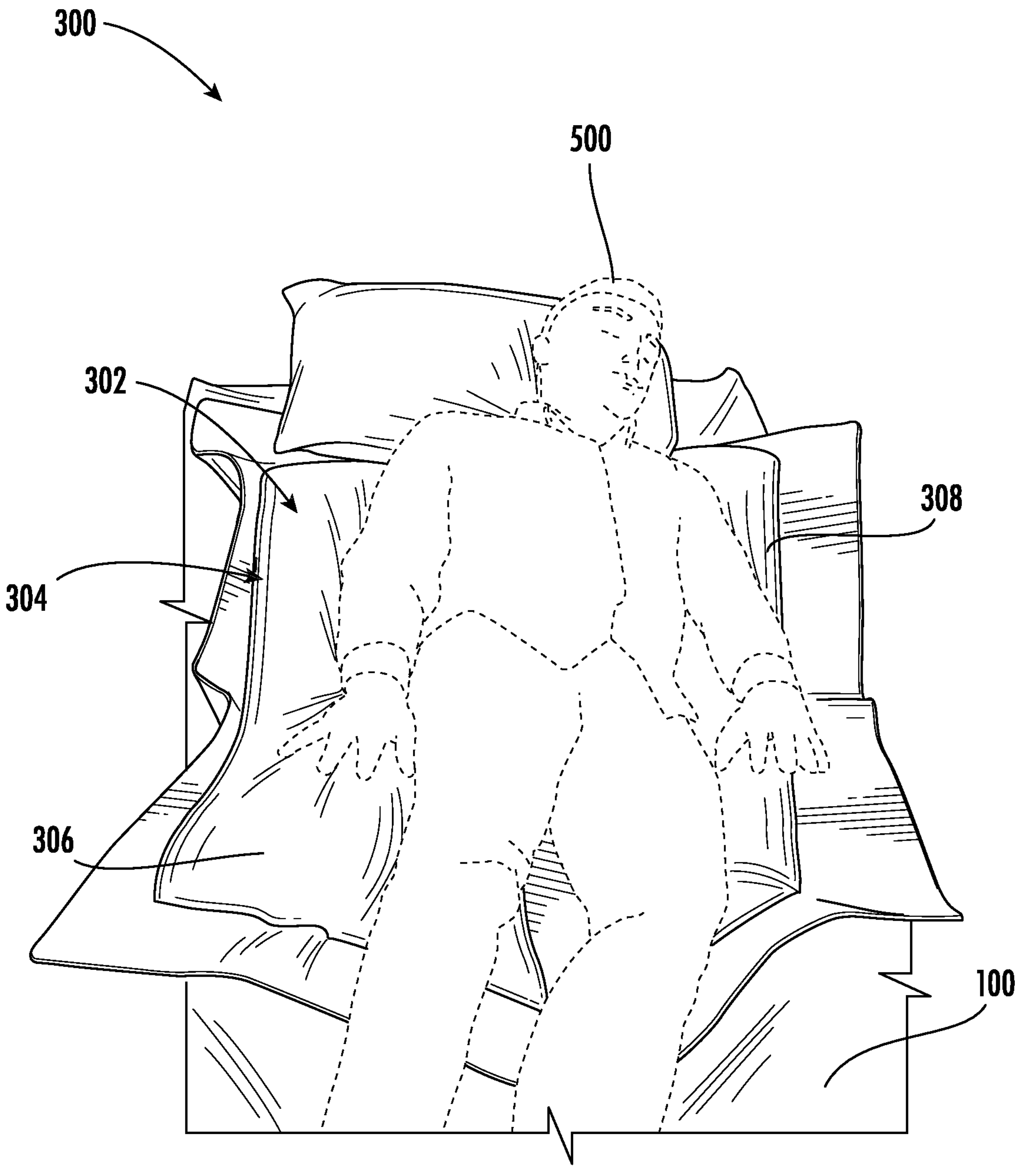
FIG. 7 is a top perspective view of a patient positioned in the patient positioning and support system of FIG. 2, according to an exemplary embodiment.

Referring to FIG. 7, another view of the patient 500 positioned on the patient positioning and support system 300 is shown, according to an exemplary embodiment. As shown in FIG. 7, the patient 500 may be positioned on the inflatable device 302, and the inflatable device 302 may conform to a variety of positions. For example, as shown in FIG. 7, the support structure 100 may be in a slightly upright position (e.g., the head of the support structure 100 may be raised thirty degrees, the feet of the support structure 100 may be raised, etc.). In addition, the patient 500 may be in a variety of positions (e.g., in a gatched position, with the knees of the patient 500 slightly elevated, etc.). The inflatable device 302 may conform to the position of the support structure 100 and/or the patient 500, such that the patient 500 may remain in a "titled" (e.g., rolled) position and supported by the inflatable device 302. As shown in FIG. 7, the inflatable device 302 conforms to the upright position of the support structure 100, and the gatched position of the patient 500, such that the patient 500 remains positioned on the top turning wedge 306 and titled slightly toward the top support bolster 308. The top support bolster 308 (and the top valley 340) may provide additional support to the patient 500, so as to resist against the patient 500 moving or sliding on the inflatable device, even in various positions of the head, legs, etc., as described above. If a healthcare provider desired to roll the patient 500, the inflatable device 302 (and components thereof) may be deflated and/or inflated to position the patient 500, as described herein.

In addition, the patient positioning and support system 50 may include an inflation device (e.g., an air pump) for providing air to inflate the inflatable device 102 or 302. As described above, the inflatable device 102 or 302 is configured to couple to at least one inflation port 110 of the inflatable device 102 or 302, or may be configured to couple to the plurality of inflation ports 110 (if provided). Furthermore, the inflation device may have features to automatically assist with turning and positioning a patient. For example, the inflation device may include a timer which causes the inflation device to inflate and/or deflate the inflatable device 102 or 302, or portions thereof, after an elapsed time. In this way, the inflatable device 102 or 302 can be used to turn the patient from side to side without any action by a caregiver. Also, the inflatable device 102 or 302, or the inflation device may include a sensor which generates a signal to cause the inflation device to inflate and/or deflate the inflatable device 102 or 302, or portions thereof, if the patient is not properly positioned or the device has become improperly deflated (i.e., an air volume within the inflatable device 102 or 302 falls below a predetermined threshold).

All or some of the components described in the patient positioning and support system 50 (and/or patient positioning and support system 300) may be provided in a kit, which may be in a pre-packaged arrangement. For example, the inflatable device 102 (deflated), or the inflatable device 302 (deflated), may be provided in a pre-folded arrangement or assembly, in approximately the same position the components would be positioned in use. In this regard, the inflatable device 102 (or inflatable device 302) may be pre-folded to form the pre-folded assembly. This pre-folded assembly can be unfolded when placed on the support structure 100 or beneath the patient 500. It should be understood that different folding patterns can be used. For example, the pre-folded inflatable device 102 (or the inflatable device 302) a may be unfolded together on the support structure 100 in order to facilitate the patient positioning system. Additionally, the inflatable device 102 (or the inflatable device 302) may be packaged by wrapping with a packaging material to form a package, and may be placed in the pre-folded assembly before packaging. Other packaging arrangements may be used in other embodiments.

Though the aforementioned patient positioning and support system 50 (and/or patient positioning and support system 300), and all the components described herein, are intended for single use and then disposal, the patient positioning and support system 50 (and/or patient positioning and support system 300), and any of the components described herein, may be refurbished for reselling and reusing. Refurbishment of the patient positioning and support system 50 (and/or its components described herein) may include steps such as inspecting the system, removing foreign particles, stains, or odors by washing one or more surfaces of the system, repairing tears or damage to the system, repairing or supplementing the stitching, such as at the seams, replacing any elements or components (e.g., the inflatable device 102, the inflatable device 302, etc.), replacing missing items from a kit, etc. Refurbishing may also include decontaminating the system and/or any of the components such as by sterilization means, such as the use of gamma radiation, electron-beam radiation, X-ray radiation, Ethylene oxide (EtO), steam, such as through the use of an autoclave, or any combination thereof. Furthermore, refurbishing and reselling may include repackaging the system and/or the components described herein.

Figure 8:
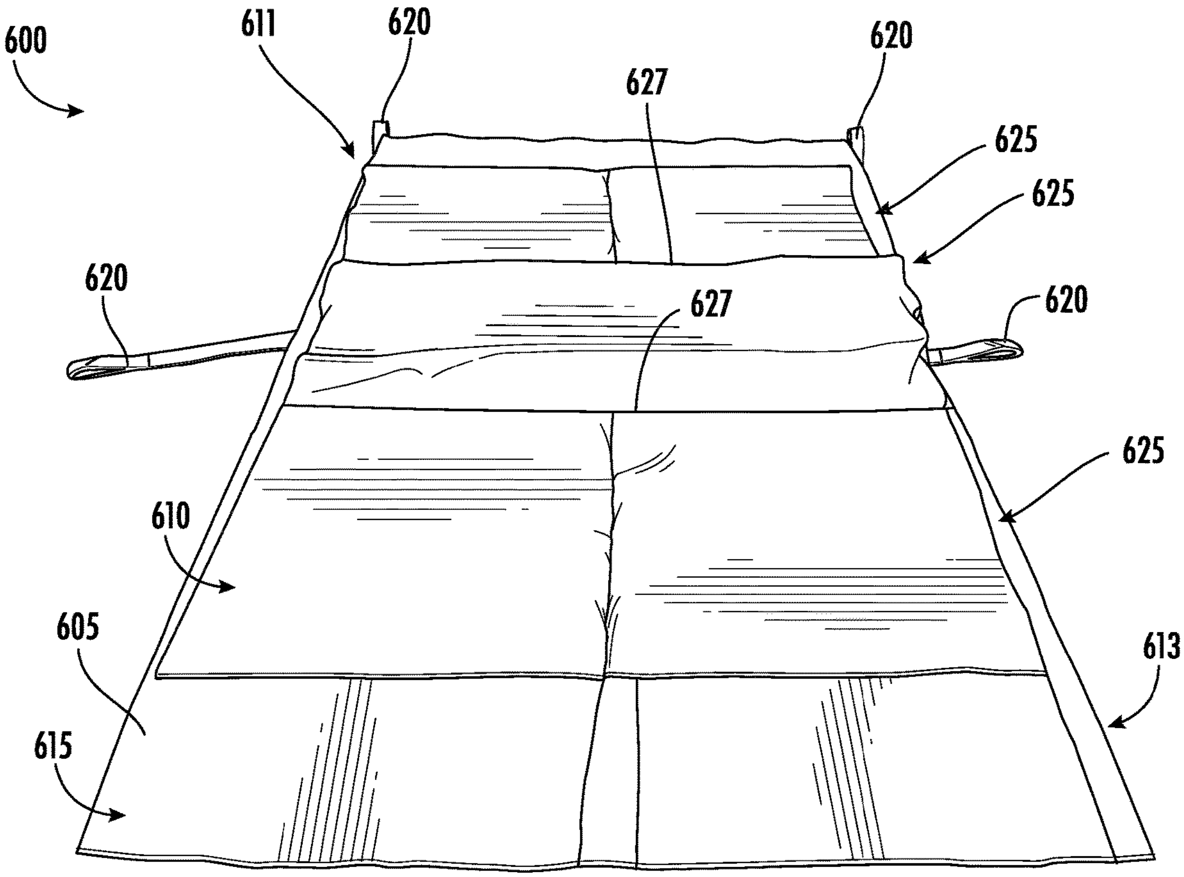
FIG. 8 is a bottom perspective view of a second embodiment of a patient positioning and support system in an unfilled configuration, according to an exemplary embodiment.

In various alternative embodiments, the patient positioning and support system includes pockets configured to be filled by support devices including, but not limited to pillows and foam supports (e.g., wedges, blocks, etc.). FIG. 8 shows a bottom perspective view of a patient positioning and support system 600, according to an exemplary embodiment. The patient positioning and support system 600 includes a top sheet 605 and a bottom sheet 610, where the top sheet 605 is configured to contact a patient positioned atop the patient positioning and support system 600 and the bottom sheet 610 is configured to contact and slide relative to a support surface upon which the patient positioning and support system 600 is placed. The patient positioning and support system 600 is configured to have a top end 611 and a bottom end 613 such that when the system 600 is in use, the top end 611 supports a head or torso of a patient and the bottom end 613 supports feet or legs of the patient. In some embodiments, the patient positioning and support system 600 may include one or more high friction regions ("retention regions") 635 disposed within or coupled to the top sheet 605, which may be configured to prevent a patient from sliding relative to the top sheet 605. The high friction regions 635 may include one or more dense fiber fabrics, woven materials, and/or non-slip polymer sections coupled to or integrally formed within the top sheet 605. In various embodiments, the bottom sheet 610 may be made of or include a slippery or low-friction material configured to slide relative to itself and/or adjacent surfaces (e.g., a support surface upon which the patient positioning and support system 600 is placed). FIG. 8 shows a bottom view of the patient positioning and support system 600 in which a bottom side 615 is facing upwards. In various embodiments, when the patient positioning and support system 600 is in use, the bottom side 615 is configured to directly contact a support surface upon which the system 600 may be placed. As shown, the patient positioning and support system 600 may include one or more handles or straps 620, which may be coupled to the top sheet 605 at one or both of the top and bottom ends 611, 613 and/or along the sides of the system 600 (i.e., side perpendicular to the top and bottom ends 611, 613). In various embodiments, the one or more straps 620 may include or be made of woven or non-woven material and may include one or more loops to facilitate ease of grasping. As shown, the bottom sheet 610 may be configured to include one or more pockets 625, which are formed between stitched regions 627, where each of the stitched regions 627 couples the bottom sheet 610 to the top sheet 605. Each of the pockets 625 may be configured to be somewhat tubular in nature such that each of the pockets 625 includes at least two opposing ends, where each pocket 625 is oriented substantially parallel with the top and bottom ends 611, 613 of the patient repositioning and support device 600.

Figure 9:
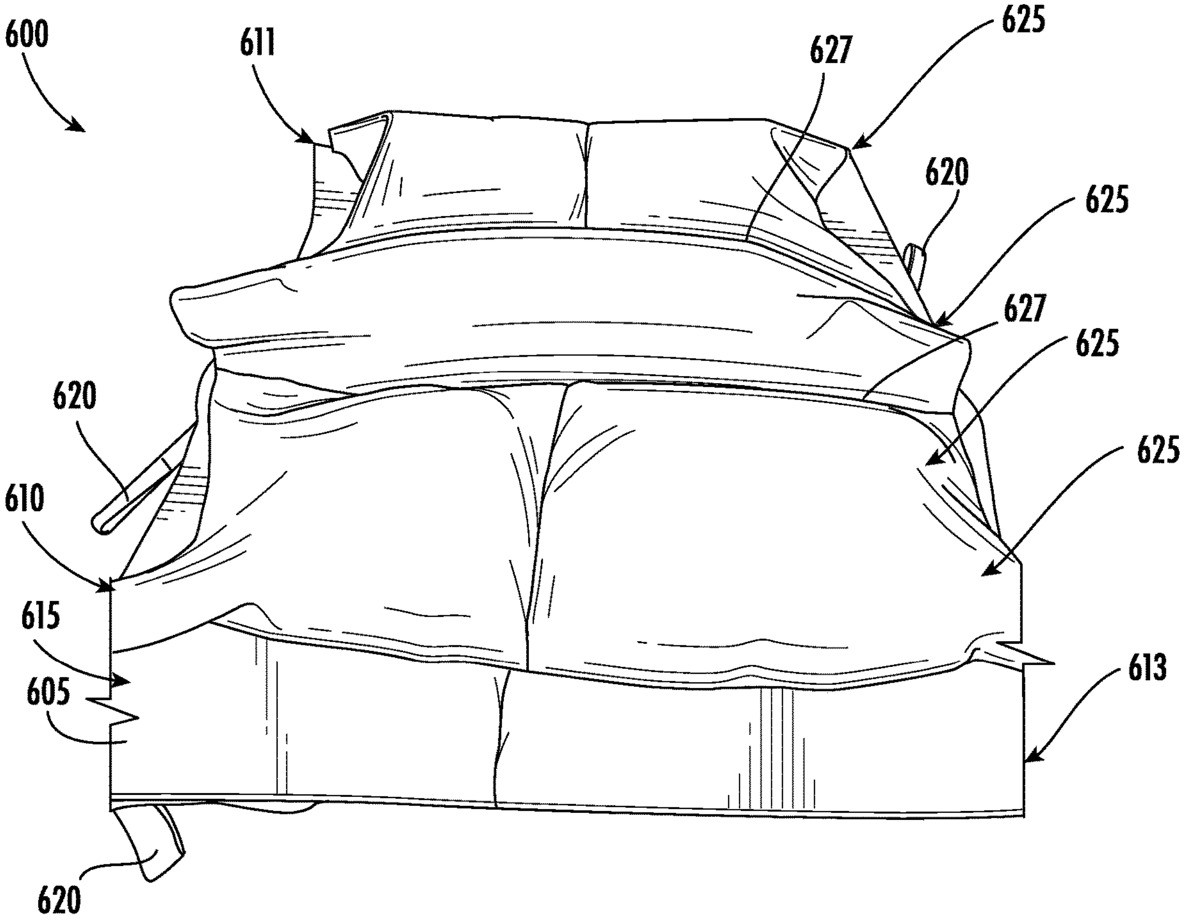
FIG. 9 is a bottom perspective view of the patient positioning and support system of FIG. 8 in a filled configuration, according to an exemplary embodiment.

As shown in FIG. 9, each of the pockets 625 may be configured to be filled with one or more support devices such as pillows, wedges, foam blocks, etc. Accordingly, when each of the pockets 625 are respectively filled with a support device, the patient positioning and support system 600 may elevate a patient or a portion of the patient's body disposed on the system 600 from the support surface upon which the system 600 is placed. Although FIGS. 8 and 9 show the patient positioning and support system 600 including three pockets 625, the system 600 may include any number of pockets 625. Furthermore, although FIGS. 8 and 9 show the patient positioning and support system 600 having the pockets 625 aligned in a configuration substantially parallel with each of the top and bottom ends 611, 613, various embodiments may include pockets 625 aligned in any configuration suitable for elevating or turning a patient positioned on the patient positioning and support system 600.

Figure 11:
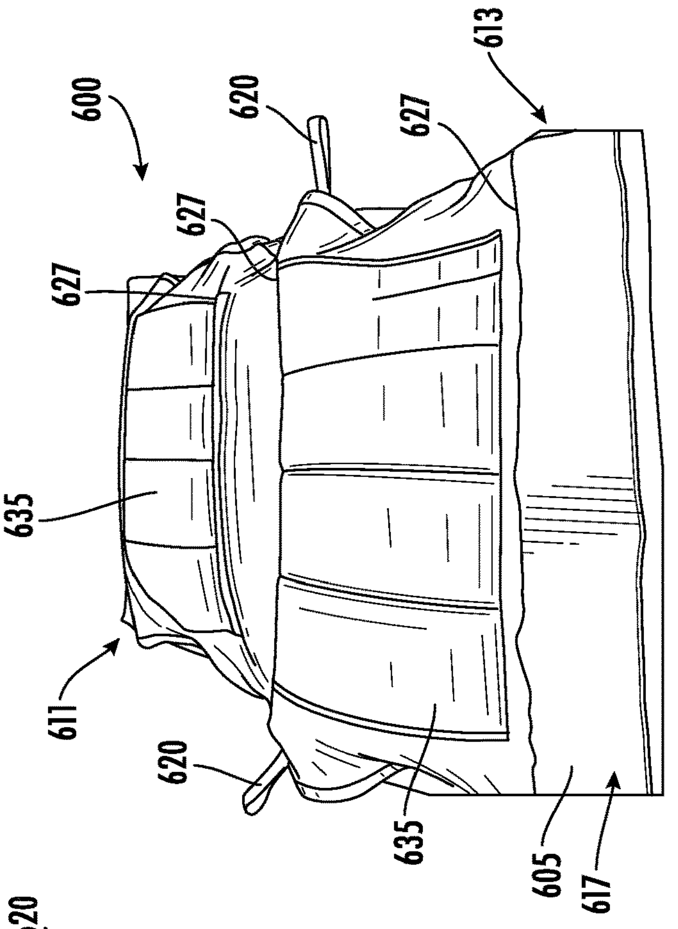
FIG. 11 is a top perspective view of the patient positioning and support system of FIG. 8 in a filled configuration, according to an exemplary embodiment.
Figure 10:
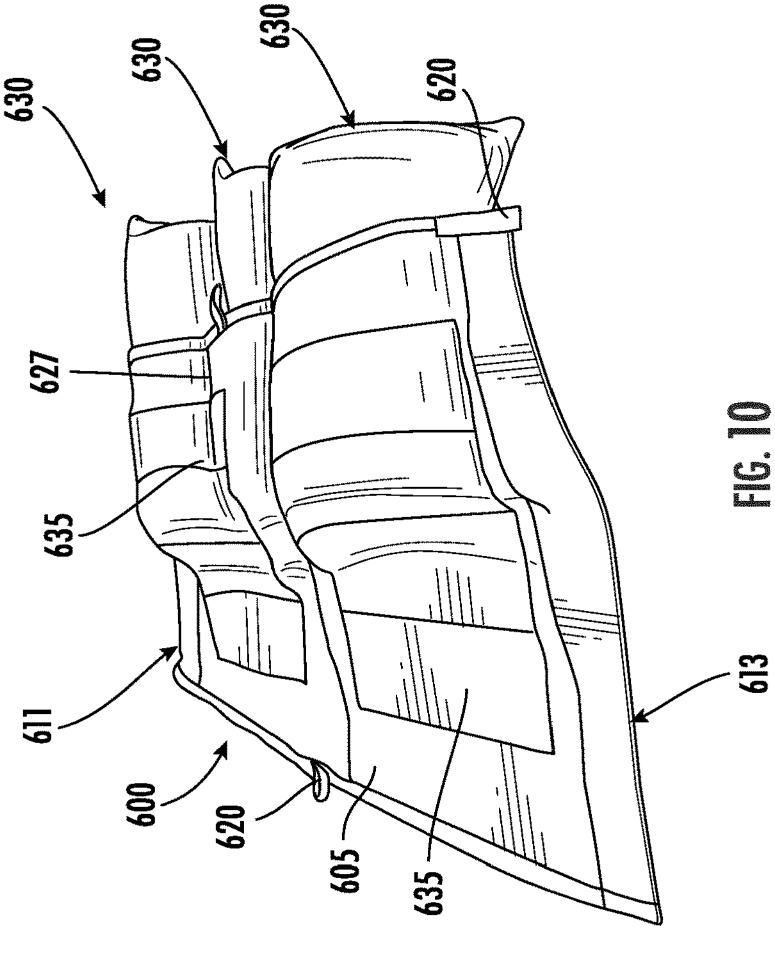
FIG. 10 is a top perspective view of the patient positioning and support system of FIG. 8 in a partially filled configuration, according to an exemplary embodiment.

In various embodiments, the pockets 625 may be configured to be filled with one or more pillows 630, as shown in FIGS. 10 and 11. An amount of filling of the pockets 625 may be based on the desired final position of the patient disposed upon the patient positioning and support system 600. For example, if the patient is to be turned or rotated, pillow(s) 630 may be inserted a portion of the way into the pockets 625, as shown in FIG. 10. In embodiments where the patient is to be fully elevated from a support surface and repositioned or transported, the pillows 630 may be inserted fully into the pockets 625, as shown in FIG. 11. In some embodiments, a single pocket 625 may be filled with multiple pillows 630. During use, when the pillow(s) 630 are inserted at least partially into the pockets 625, a patient disposed atop the patient positioning and support system 600 may be elevated from a support surface (e.g., hospital bed), which enables the patient to be rotated, turned, repositioned, or transported from one surface to another as facilitated by the bottom sheet 610 sliding relative to the support surface and/or as pulled or guided by one or more medical personnel pulling on the straps 620. In various embodiments, the pillows 630 may be filled with at least one of air or stuffing (e.g., loose fiber, polyester, down, etc.).

Figure 12:
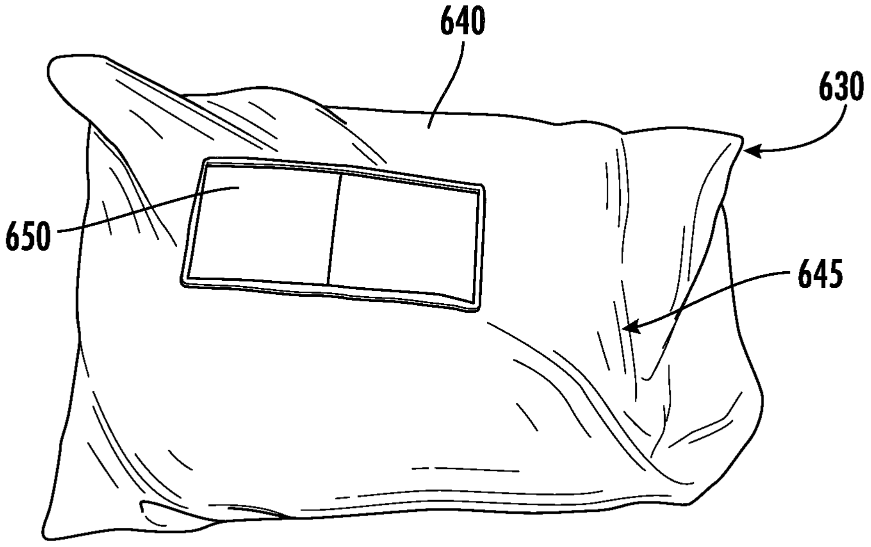
FIG. 12 is a top perspective view of a pillow case configured to be positioned within the patient positioning and support system of FIG. 8, according to an exemplary embodiment.
Figure 13:
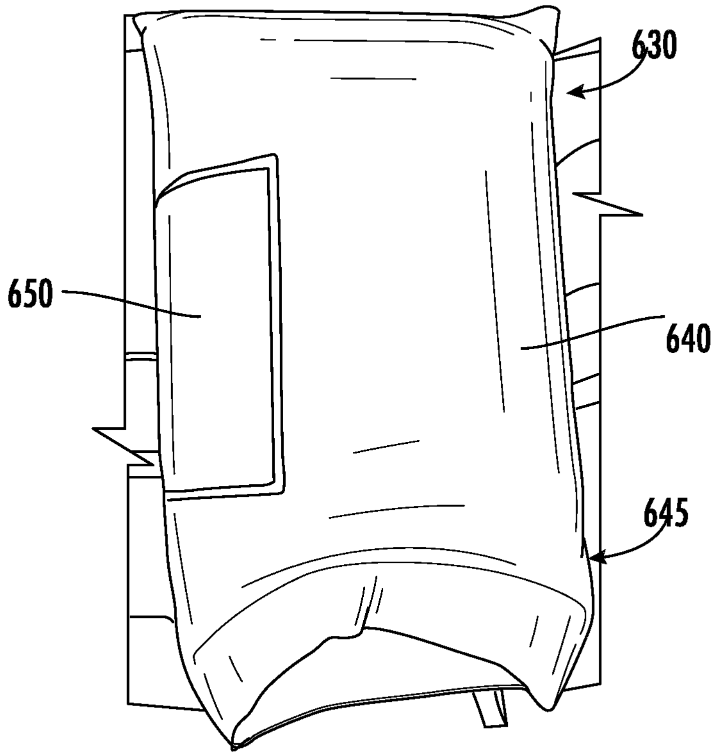
FIG. 13 is a top perspective view of another pillow case configured to be secured within the patient positioning and support system of FIG. 8, according to an exemplary embodiment.

FIGS. 12 and 13 show top perspective views of the pillow 630, which is configured to be inserted within the pockets 625, according to various exemplary embodiments. As shown, the pillow 630 may include a pillowcase 640, which is configured to prevent soiling of the pillow 630 and/or insulate an inner compartment or receptacle 645 (i.e., containing the air and/or stuffing) from contamination from bacterial, fungal, and/or microbial contaminants. As shown in FIG. 12, the pillowcase 640 may include at least one region 650 configured to engage with an inner surface of the pockets 625 to secure the pillow 630 therein. In various embodiments, the at least one region 650 may include or be made of lint brush fabric, as shown in FIG. 12. In various embodiments, the at least one region 650 may include or be made of lint brush and loop fabric, as shown in FIG. 13, to secure the pillow 630 within at least one of the pockets 625. In various embodiments, the pockets 625 may include at least one engagement region disposed along an inner surface of the pockets 625, which may be configured to engage with the at least one regions 650 of the pillows 630 to secure the pillows 630 within the pockets 625. Although FIGS. 12 and 13 show the at least one region 650 configured as a singular rectangular region disposed on a side of the pillowcase 640, in various embodiments, the pillowcase 640 may include any number of regions 650, which may be configured to have any suitable shape for engaging with an inner surface of the pockets 625.

Figure 14:
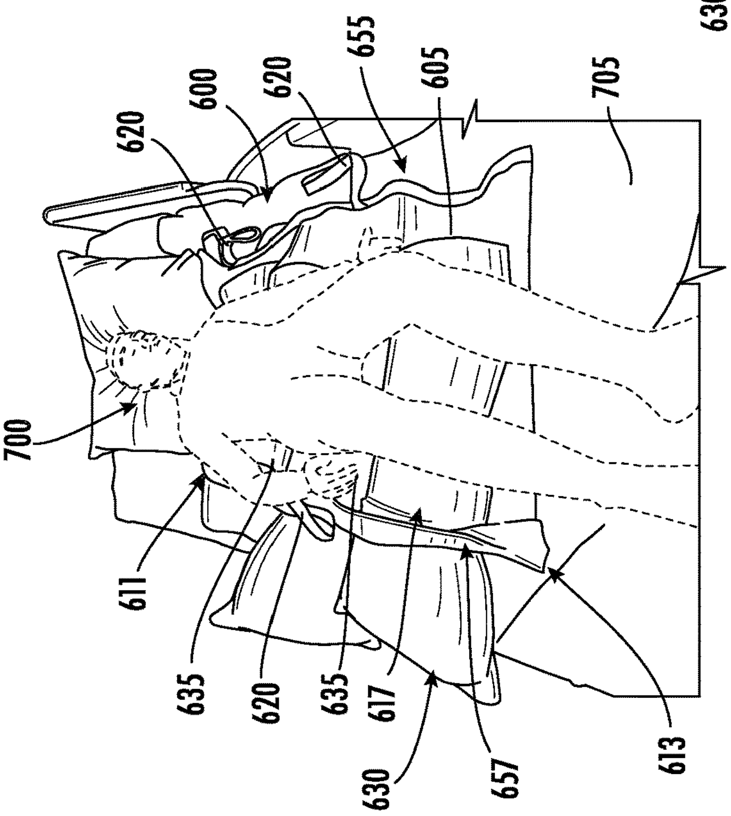
FIG. 14 is a top perspective view of the patient positioning and support system of FIG. 8 supporting a patient during repositioning, according to an exemplary embodiment.
Figure 15:
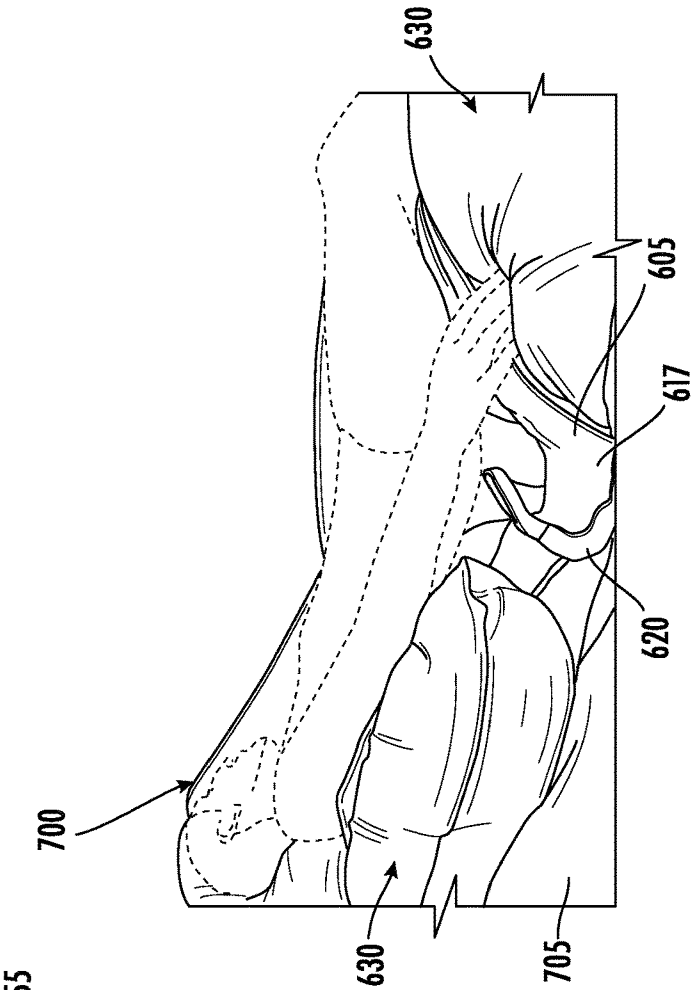
FIG. 15 is a side view of the patient positioning and support system of FIG. 8 supporting a patient during repositioning, according to an exemplary embodiment.
Figure 16:
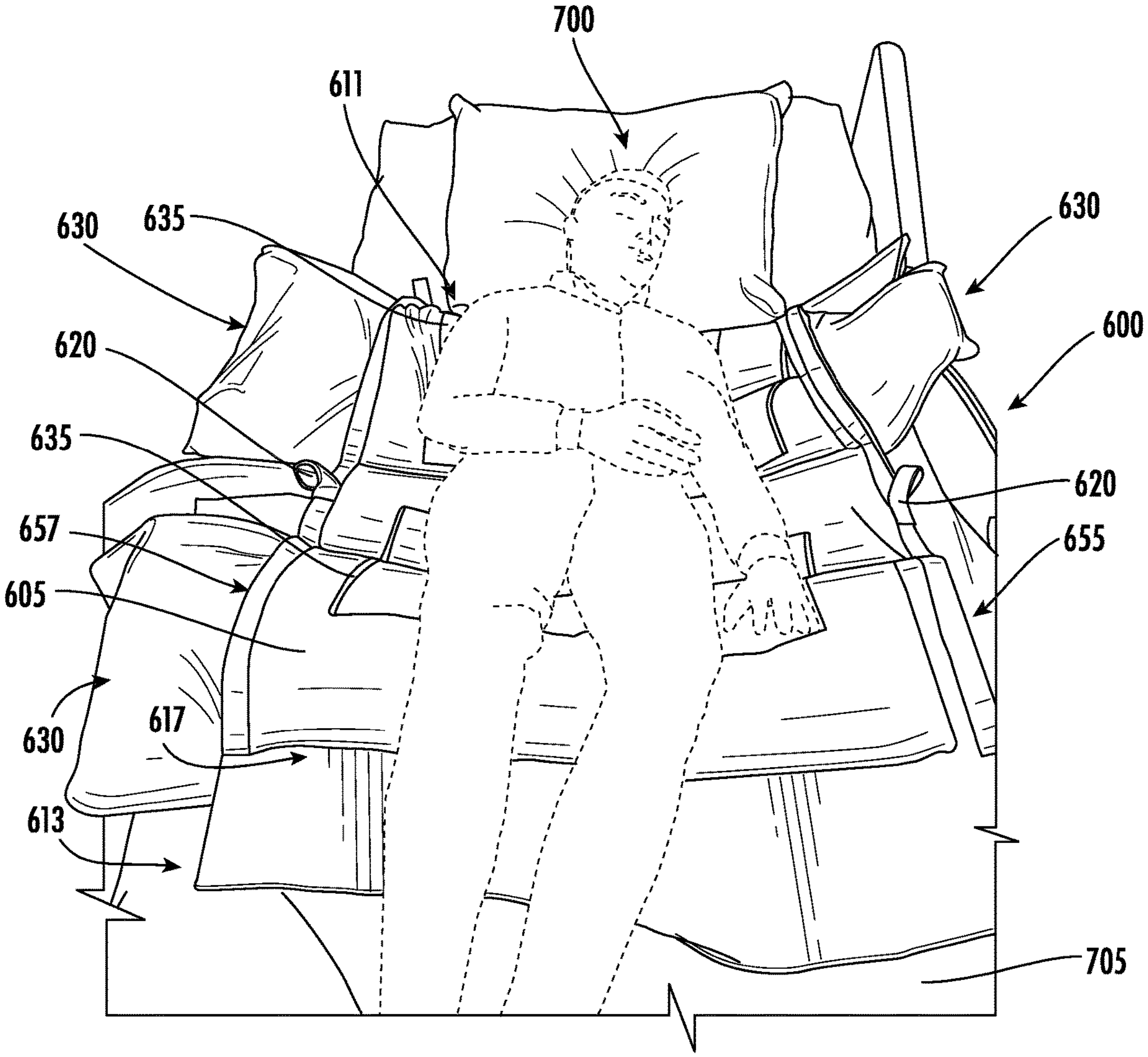
FIG. 16 is a top perspective view of the patient positioning and support system of FIG. 8 supporting a patient, according to an exemplary embodiment.

FIGS. 14-16 show the patient positioning and support system 600 being used to reposition a patient 700, where the patient 700 is disposed in a supine position. As shown in FIG. 14, the patient 700 may be disposed on a top side 617 of the patient positioning and support system 600 such that the patient 700 is disposed to contact the top sheet 605. As shown, the patient positioning and support device 600 is oriented such that the top end 611 is disposed near the head of the patient 700 and the bottom end 613 is disposed near the legs and/or feet of the patient 700. The pockets 625 within the bottom sheet 610 are positioned so as to contact a support surface 705 upon which the patient 700 and the patient positioning and support system 600 are disposed. To reposition the patient 700, such as to rotate the patient from the supine position to an inclined or prone position, one or more pillows 630 may be inserted into the pockets 625. As shown, the pillows 630 may be inserted into the pockets 625 from a first side 657, which is disposed an opposing second side 655, where both the sides 655, 657 are oriented substantially perpendicular to the top and bottom ends 611, 613. Accordingly, when the pillows 630 are inserted along the first side 657, the first side 657 becomes elevated relative to the second side 655, which results in a rotation of the patient 700.

In various embodiments, a spacing of the stitched regions 627 and/or a width of the pockets 625 may be configured such that various parts of the patient 700 (i.e., parts of the patient's body) do not contact the top side 617. For example, as shown in FIG. 15, a width of the pockets 625 may be configured such that when the pillows 630 are inserted within the pockets 625, the sacrum of the patient 700 is elevated and not load bearing. Accordingly, when in use, the patient positioning and support system 600 may relieve pressure points and prevent stress on areas of potentially high load throughout the body of the patient 700 during repositioning. As shown in FIG. 16, the pillows 630 may be fully inserted within the pockets 625 to elevate the patient 700 from the support surface 705. When the pillows 630 are fully inserted, the body of the patient 700 may be supported by the patient repositioning and support surface 600 such that points of high pressure (e.g., sacrum, should blades, etc.) are elevated and cushioned by the pillows 630. Thus, to reposition, support, and/or transfer the patient 700, the patient repositioning and support system 600 may be inserted beneath the patient 700. One or more pillows 630 may then be inserted, partially or fully, within the pockets 625 to elevate the patient from the support surface 705. One or more medical personnel may then use the one or more handles or straps 620 to manipulate the patient repositioning and support system 600 to reposition, transfer, and/or otherwise support the patient 700.

Figure 18:
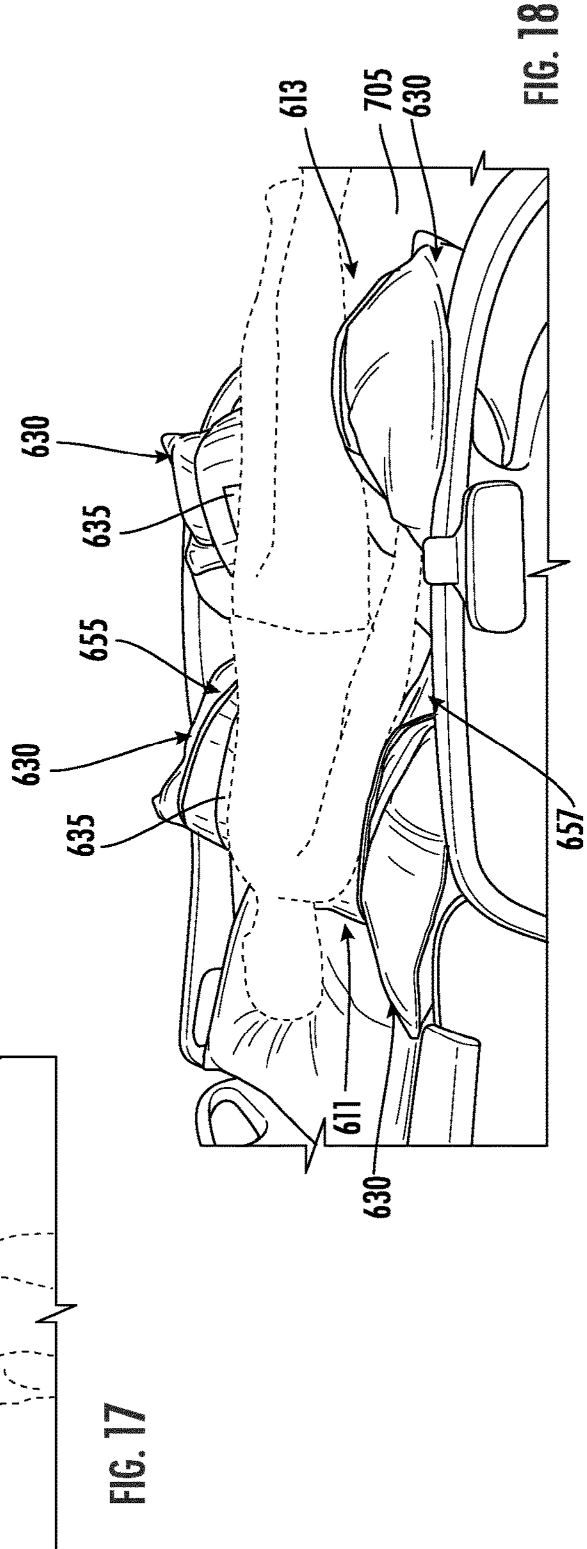
FIG. 18 is a side view of the patient positioning and support system of FIG. 8 supporting a patient in a prone position, according to an exemplary embodiment.
Figure 17:
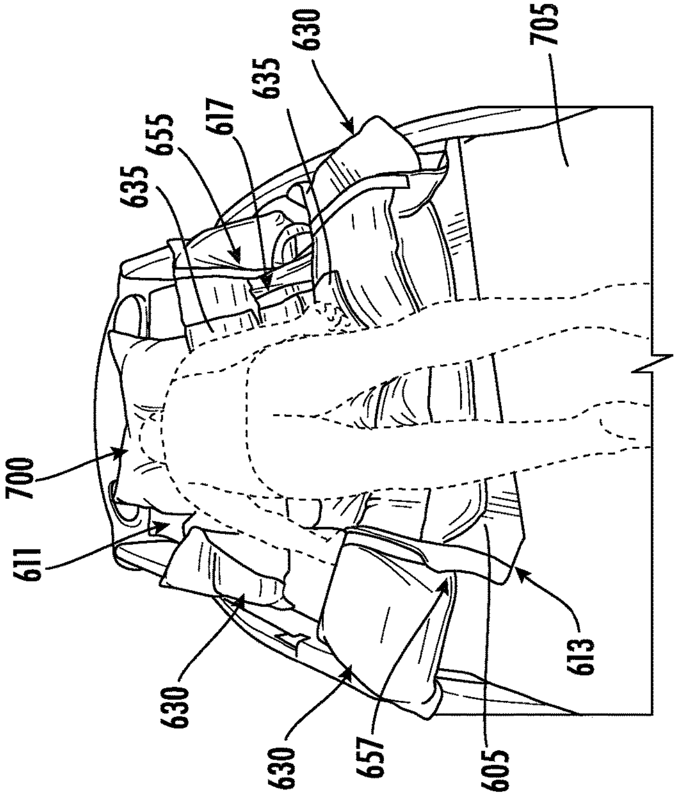
FIG. 17 is a top perspective view of the patient positioning and support system of FIG. 8 supporting a patient in a prone position, according to an exemplary embodiment.

FIGS. 17 and 18 show the patient repositioning and support system 600 used to provide support to the patient 700 when the patient 700 is in a prone position. As shown, the patient repositioning and support system 600 may be configured such that when the pockets 625 are filled with the pillows 630, various parts of the patient 700 body are offloaded (i.e., not bearing load or in contact with a surface of the system 600). For example, s shown in FIG. 18, the patient 700 stomach is elevated and not in contact with the top side 617 of the patient repositioning and support device such that the stomach is not load bearing or not subject to excessive pressure during repositioning of the patient 700. In various embodiments, a width of the pockets 625 (i.e., a distance between the stitched regions 627) may be configured to facilitate offloading of various other regions of the patient 700 body including, but not limited to, a chest (e.g., mammary glands), knees, or head.

Figure 19:
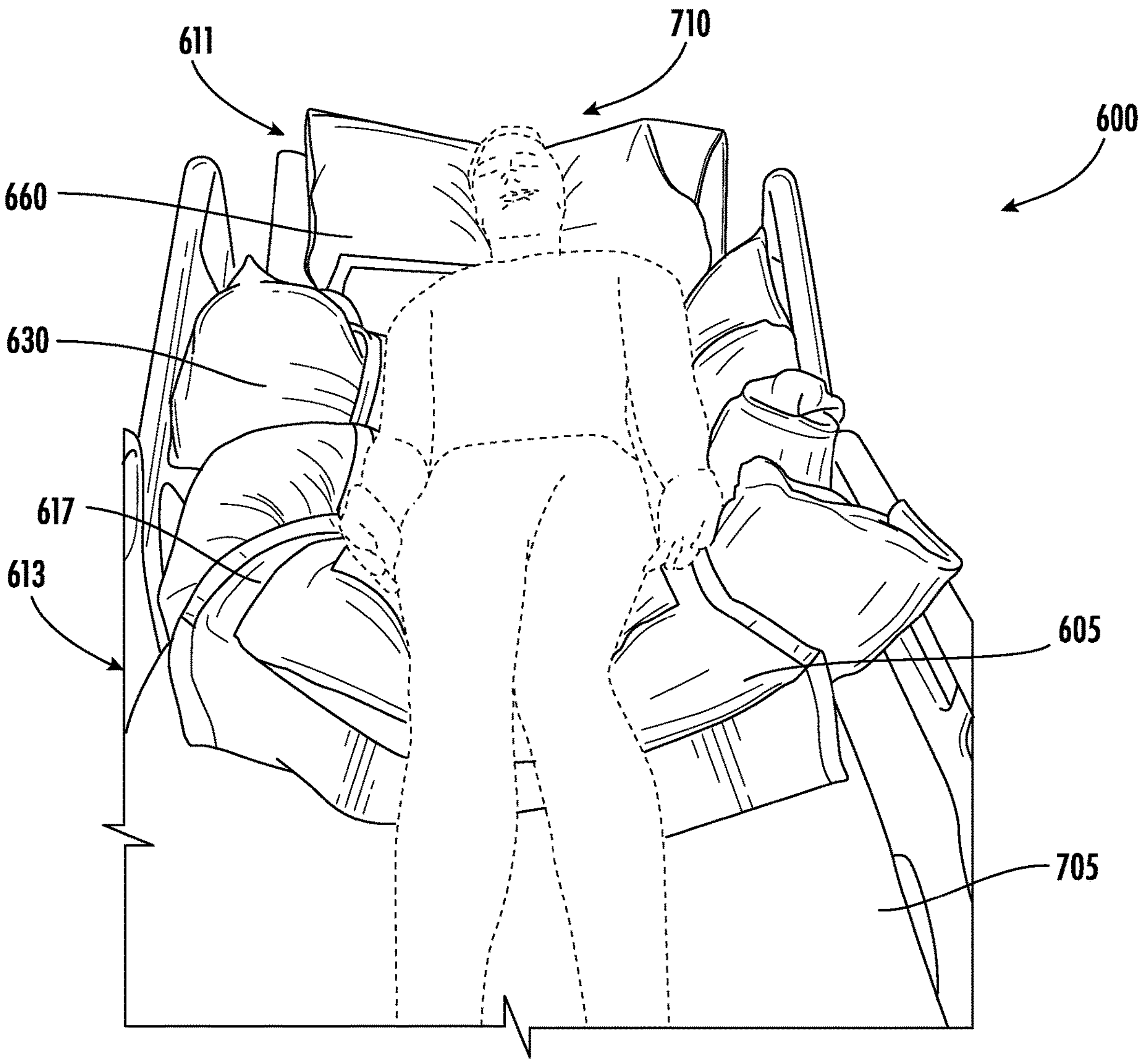
FIG. 19 is a top perspective view of a patient positioning and support system including a cushion for supporting a patient's head, according to an exemplary embodiment.

In yet other embodiments, the patient repositioning and support system 600 may be configured to directly provide support to the head of the patient 700, as shown in FIG. 19. As shown, the patient repositioning and support system 600 may include a fourth pocket 625, which is configured to define a support region or cushion 660 for supporting the head 710 of the patient 700. In various embodiments, the cushion 660 may be configured to have the same or different dimensions (e.g., width of the respective pocket 625) relative to the other pockets 625. In various embodiments, a stiffness, thickness, or constituency (e.g., an amount of air, a stuffing type or amount, etc.) may be based on a desired level of elevation, a degree or amount of repositioning, and/or a desired amount of cushion to be provided for the patient 700.

Notwithstanding the embodiments described above in reference to FIGS. 1-19, various modifications and inclusions to those embodiments are contemplated and considered within the scope of the present disclosure.

As utilized herein with respect to numerical ranges, the terms "approximately," "about," "substantially," and similar terms generally mean +/− 10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A patient positioning and support system, the patient positioning and support system comprising:

a first sheet comprising a first edge and second edge opposite the first edge, the first sheet configured to contact a patient; and a second sheet comprising a third edge and a fourth edge opposite the third edge, the second sheet is configured to contact a support surface, the third edge coupled to the first edge, the fourth edge coupled to the second edge, the second sheet coupled to the first sheet along a first stitched region separated from the third edge by a first distance and from the fourth edge by a second distance greater than the first distance, the second sheet cooperating with the first sheet and the first stitched region to define a first opening, the first opening extending between the third edge and the first stitched region to form a first pocket, the first pocket configured to form a first cushion for a head region of the patient while the first sheet and the second sheet support a sacrum region of the patient and a leg region of the patient.

2. The patient positioning and support system of claim 1, wherein the first pocket is positioned parallel with a top end of the first sheet.

3. The patient positioning and support system of claim 2, wherein a second pocket is positioned parallel with the top end of the first sheet, the second pocket configured to form a second cushion for the leg region of the patient while the first sheet and the second sheet supports the head region of the patient and the sacrum region of the patient.

4. The patient positioning and support system of claim 1, wherein the first pocket comprises an engagement region at an interior surface of the first pocket.

5. The patient positioning and support system of claim 4, wherein the engagement region is formed of a loop fabric, the engagement region being configured to engage with a support device to secure the support device within the first pocket.

6. The patient positioning and support system of claim 1, wherein the first sheet comprises one or more retention regions are positioned on an exterior surface of the first pocket, the one or more retention regions configured to prevent sliding of the patient relative to the first sheet.

7. The patient positioning and support system of claim 6, wherein the first sheet is composed of a first material with a first friction, and the one or more retention regions are composed of a second material with a second friction, wherein the second friction is greater than the first friction.

8. The patient positioning and support system of claim 1, wherein:

the second sheet is coupled to the first sheet along a second stitched region separated from the third edge by a third distance and from the fourth edge by a fourth distance less than the third distance, the second sheet cooperating with the first sheet and the second stitched region to define a second opening, the second opening extending between the fourth edge and the second stitched region, forming a second pocket.

9. The patient positioning and support system of claim 8, wherein:

the second sheet cooperates with the first sheet and the second stitched region to define a third opening, the third opening extending between the first stitched region and the second stitched region, defining a fifth distance, and forming a third pocket.

10. The patient positioning and support system of claim 9, wherein:

the first distance, the fourth distance, and the fifth distance are equal in length; and the first pocket, the second pocket, and the third pocket have equal areas.

11. The patient positioning and support system of claim 9, wherein the first opening, the second opening, and the third opening are positioned on a longitudinal edge of the first sheet.

12. The patient positioning and support system of claim 1, wherein the first sheet further comprises a strap comprising a loop, the strap configured to facilitate movement of the patient positioning and support system relative to the patient.

13. The patient positioning and support system of claim 3, wherein a third pocket is positioned parallel with the top end of the first sheet, the third pocket configured to form a third cushion for the sacrum region of the patient while the first sheet and the second sheet supports the head region of the patient and the leg region of the patient.

14. A system comprising:

the patient positioning and support system of claim 1; and a first support device including a first case enclosing a first soft material;

wherein the first pocket facilitates removal of the first support device via the first opening while the first opening remains open.

15. The system of claim 14, wherein the first support device is a wedge, a foam block, or a pillow configured to engage with an interior surface of the first pocket.

16. The system of claim 15, wherein the first support device the pillow includes a pillowcase with an engagement region, the engagement region configured to engage with the first pocket to secure the pillow within the first pocket.

17. The system of claim 14, wherein:

the second sheet is coupled to the first sheet along a second stitched region separated from the third edge by a third distance and from the fourth edge by a fourth distance greater than the third distance, the second sheet cooperating with the first sheet and the second stitched region to define a second opening, the second opening extending between the fourth edge and the second stitched region to form a second pocket, the second sheet further cooperating with the first sheet and the second stitched region to define a third opening, the third opening extending between the first stitched region and the second stitched region to form a third pocket.

18. The system of claim 17, wherein the first support device includes a pillow including a pillowcase with an engagement region, the engagement region configured to engage with the first pocket, the second pocket, or the third pocket to secure the pillow within the first pocket, the second pocket, or the third pocket.

19. The system of claim 17, wherein:

the system further includes a second support device comprising a second case enclosing a second soft material; and a third support device comprising a third case enclosing a third soft material.

20. The patient positioning and support system of claim 7, wherein:

the first sheet is composed of the first material with the first friction;

the second sheet is composed of a third material with a third friction; and the third friction is less than the first friction.

* * * * *